United States Patent
Yoshida et al.

(10) Patent No.: US 10,232,891 B2
(45) Date of Patent: Mar. 19, 2019

(54) VEHICLE BODY STRUCTURE

(71) Applicant: HONDA MOTOR CO., LTD., Tokyo (JP)

(72) Inventors: Masayasu Yoshida, Wako (JP); Akira Haga, Wako (JP); Taiga Marukawa, Wako (JP); Tomohito Kamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 15/263,926

(22) Filed: Sep. 13, 2016

(65) Prior Publication Data

US 2017/0080978 A1    Mar. 23, 2017

(30) Foreign Application Priority Data

Sep. 17, 2015    (JP) ................................ 2015-184387

(51) Int. Cl.
     *B62D 25/20*    (2006.01)
(52) U.S. Cl.
     CPC ..... *B62D 25/2036* (2013.01); *B62D 25/2018* (2013.01)
(58) Field of Classification Search
     CPC .. B62D 21/155; B62D 21/152; B62D 25/145; B62D 25/2018; B62D 25/2036
     USPC ...................................... 296/187.09, 203.02
     See application file for complete search history.

(56) References Cited

U.S. PATENT DOCUMENTS

| | | | |
|---|---|---|---|
| 8,469,442 B1* | 6/2013 | Pencak | B62D 25/14 296/187.12 |
| 2005/0082876 A1* | 4/2005 | Akasaka | B62D 21/152 296/203.01 |
| 2005/0082877 A1* | 4/2005 | Gotou | B62D 21/157 296/204 |
| 2012/0212009 A1* | 8/2012 | Ishizono | B62D 25/025 296/193.07 |
| 2012/0256448 A1* | 10/2012 | Yasui | B62D 21/152 296/209 |
| 2013/0069393 A1* | 3/2013 | Kihara | B62D 25/082 296/203.02 |
| 2015/0008703 A1* | 1/2015 | Furusaki | B62D 21/152 296/187.08 |

(Continued)

FOREIGN PATENT DOCUMENTS

JP    H5-92063 U      12/1993
JP    10045034 A  *  2/1998

(Continued)

OTHER PUBLICATIONS

Office Action dated Jul. 25, 2017, issued in counterpart Japanese Application No. 2015-184387, with English machine translation. (4 pages).

*Primary Examiner* — Hilary L Gutman
(74) *Attorney, Agent, or Firm* — Westerman, Hattori, Daniels & Adrian, LLP

(57) ABSTRACT

A vehicle body structure includes a dash lower panel, an outrigger, a dash cross member, and a side sill. A jack up stiffener having lower compressive strength against a load from the front than the side sill is installed inside the side sill. The outrigger is coupled to a front end part of the jack up stiffener. The dash cross member is coupled to a front end part of the side sill.

16 Claims, 21 Drawing Sheets

(56) References Cited

U.S. PATENT DOCUMENTS

| | | | |
|---|---|---|---|
| 2016/0052554 A1* | 2/2016 | Ozawa | B62D 21/152 |
| | | | 296/187.09 |
| 2016/0236714 A1* | 8/2016 | Tatsuwaki | B62D 25/14 |
| 2016/0272253 A1* | 9/2016 | Yoshida | B62D 25/14 |
| 2017/0080978 A1* | 3/2017 | Yoshida | B62D 21/155 |
| 2017/0106914 A1* | 4/2017 | Abe | B62D 21/157 |
| 2017/0203792 A1* | 7/2017 | Sunohara | B62D 25/2036 |
| 2017/0247057 A1* | 8/2017 | Tatsuwaki | B62D 21/11 |
| 2018/0065676 A1* | 3/2018 | Yoshida | B62D 25/20 |

FOREIGN PATENT DOCUMENTS

| | | | |
|---|---|---|---|
| JP | 2013-169806 A | | 9/2013 |
| JP | 2013169806 A | * | 9/2013 |

* cited by examiner

VEHICLE BODY STRUCTURE

TECHNICAL FIELD

The present disclosure relates to a vehicle body structure, and particularly to a vehicle body structure at and around a dash lower panel.

BACKGROUND

For example, Japanese Patent Application Publication No. 2013-169806 (Claim 1, FIG. 1) discloses a vehicle body bottom structure including left and right side sills that extend in a longitudinal direction with respect to a vehicle body along vehicle-widthwise outer end parts of the vehicle body, the structure being characterized by including: a dashboard cross member (dash cross member) that is coupled to each of front ends of the left and right side sills and extend in a vehicle widthwise direction; and an outrigger that is connected to each of rear ends of front side frames, is coupled to each of the front ends of the left and tight side sills, and extends in the vehicle widthwise direction, characterized in that a dashboard lower (dash lower panel) having wheel house parts (wheel arch-shaped parts) is sandwiched between and joined to the dash board cross member and the outrigger. This structure reduces the amount of retraction of the dashboard lower upon application of a narrow offset collision load.

SUMMARY

In the existing example above, since both the dash cross member and the outrigger are coupled to each of the front ends of the side sills, the front ends of the side sills have large strength. For this reason, in the event of a small overlap collision where the amount of overlap between vehicles is small, an oblique collision against a front pillar, or the like, the front ends of the side sills would be less readily crushable and not fully able to absorb collision energy. Accordingly, acceleration of deceleration might be somewhat applied on an occupant.

Further, in the existing example above, front pillars stand at the front ends of the side sills respectively, and thus an intersection part between each side sill and the corresponding front pillar is equal to a bend part where the front pillar is bent upon receipt of a collision load in the event of a small overlap collision or the like. Accordingly, the front pillar is likely to fall rearward, end therefore a front side door might become hard to open due to deformation of a door opening.

The present disclosure has been made in view of the forgoing points, and it is preferable to provide a vehicle body structure capable of reducing acceleration of deceleration to be applied on an occupant.

Furthermore, it is also preferable to provide a vehicle body structure which makes a front pillar less likely to fall rearward.

In order to solve the above problems, one aspect of a vehicle body structure includes: a dash lower panel that partitions a power source device compartment from a vehicle compartment; an outrigger that is placed on a side of the dash lower panel close to the power source device compartment and extends in a vehicle widthwise direction; a dash cross member that is placed on a side of the dash lower panel close to the vehicle compartment and extends in the vehicle widthwise direction to couple left and right front pillars to each other; and a side sill that is placed on a vehicle-widthwise outer end part of a vehicle body and extends in a longitudinal direction. In the structure, a jack up stiffener having compressive strength against a load from a front lower than the side sill is installed inside the side sill. The outrigger is coupled to a front end part of the jack up stiffener. The dash cross member is coupled to a front end part of the side sill.

Accordingly, the outrigger is coupled to the front end part of the jack up stiffener having compressive strength against a load from the front lower than the side sill. This enables the jack up stiffener to absorb collision energy by being crushed in the event of a small overlap collision or an oblique collision against the front pillar. Thereby, acceleration of deceleration to be applied on an occupant can be reduced.

Further, it is preferable that the side sill has a side sill inner panel on a vehicle interior side and a side sill outer panel on a vehicle exterior side, and the side sill inner panel is provided with a high strength member having strength higher than the side sill inner panel. In this case, it is favorable that a crushing space is placed between the outrigger and a front end part of the high strength member. Besides, it is favorable that a vehicle-widthwise outer end part of the dash cross member is coupled to the side sill inner panel at a position ahead of the high strength member.

By doing so, if the outrigger is retracted at the time of collision, collision energy can be absorbed by the crush of the crushing space. Besides, even if the outrigger is retracted, the dash cross member is supported by the high strength member from behind and therefore less likely to be retracted, which suppresses deformation of the vehicle compartment. Accordingly, it is possible to facilitate absorption of collision energy and suppress deformation of the vehicle compartment at the same time.

Further, it is preferable that a through hole is formed in the jack up stiffener.

This makes the jack up stiffener likely to be crushed in the event of a collision, and enables weight reduction of the jack up stiffener.

Further, it is preferable that the jack up stiffener has a jack up part that is supported by a jack, and a step part is formed on a circumference of the through hole located above the jack up part.

This makes the jack up stiffener weak and likely to be crushed against a load from the front and, in contrast, strong against a load in the vertical direction.

Further, it is preferable that the structure includes: a front side frame that is placed on the side of the dash lower panel close to the power source device compartment and extends in the longitudinal direction; the outrigger that is placed between the front side frame and the side sill; and a first horizontal member that is placed opposite the outrigger with the front side frame interposed therebetween. In this case, it is favorable that the dash cross member and the dash lower panel form a first closed section. It is favorable that the outrigger and the dash lower panel form a second closed section. It is favorable that the first horizontal member and the dash lower panel form a third closed section. It is favorable that the first closed section and the second closed section are located at positions overlapping each other in the longitudinal direction, and the first closed section and the third closed section are located at positions displaced from each other in a vertical direction.

By doing so, when a collision load is applied on the front side frame by a frontal collision, the collision load is transmitted from the rear end of the front side frame to the dash cross member. Then, the dash cross member is retracted (deformed) by a larger amount in the sectional displacement area with low sectional strength formed by the first closed section and the third closed section than in the sectional overlap area formed by the first closed section and the second closed section. Thereby, collision energy can be absorbed, and thus acceleration of deceleration to be applied on an occupant can be reduced.

Further, it is preferable that the dash cross member and the outrigger are each made of a high strength member. In this case, it is favorable that the dash cross member has a cross member upper flange and a cross member lower flange joined to the dash lower panel. It is favorable that the outrigger has an outrigger upper flange part and an outrigger lower flange part joined to the dash lower panel. It is favorable that the cross member upper flange and the outrigger upper flange part are joined together with the dash lower panel interposed therebetween. It is favorable that the outrigger lower flange part is disposed behind the cross member lower flange.

By doing so, in the event of a small overlap collision or the like, it is possible to absorb collision energy by tolerating deformation of the outrigger, and reduce damage to be applied on leg parts of an occupant by suppressing deformation of the dash cross member.

Further, it is preferable that the side sill inner panel has: a side sill inner upper that is made of a steel plate and includes an angular ridge part; and a side sill inner lower that has strength higher than the side sill inner upper. In this case, it is favorable that a side sill reinforcement panel being the high strength member is bent to be disposed along the angular ridge part. Besides, it is favorable that the side sill inner upper and the side sill inner lower respectively have joint flanges that are joined together, and, while the joint flanges are laid on a vehicle-widthwise outer end part of a floor panel, the joint flanges and the vehicle-widthwise outer end part are joined together.

This makes it possible to secure strength enough to support a collision load while reducing the weight of the side sill inner panel.

Further, it is preferable that a tie-down bracket for a tie-down hook to engage therewith is installed in an area near the joint flanges of the side sill inner panel.

This makes it possible to increase the strength of the side sill inner panel in the area near the joint flanges.

Further, it is preferable that the structure further includes a lid member that closes a front end opening of the side sill from a front. In this case, it is favorable that a front flange bent inward in the vehicle widthwise direction is formed at a front end part of the jack up stiffener. It is favorable that a vehicle-widthwise inner end part of the outrigger is joined to an outer side face of the front side frame and the dash lower panel by welding. It is favorable that a vehicle-widthwise outer end part of the outrigger, the front flange of the jack up stiffener, and the lid member are laid one in front of another and fixed with a bolt.

By doing so, since the members are assembled together by full use of welding and the bolt, it is possible to perform the assembly work without any trouble and increase assembly strength between the members.

Further, it is preferable that the dash lower panel has a wheel arch-shaped part constituting a part of a wheel arch, and the structure further includes a reinforcement panel that covers the wheel arch-shaped part from the vehicle compartment side. In this case, it is favorable that the dash cross member is formed integrally with the reinforcement panel.

By doing so, since the dash cross member is formed integrally with the reinforcement panel, the support performance of the dash cross member against a collision load is enhanced.

Further, it is preferable that the structure further includes a first floor frame that is disposed on a lower face of a floor panel and inside the front side frame in the vehicle widthwise direction. In this case, it is favorable that the first horizontal member is coupled to a front end part of the first floor frame, and disposed below and adjacent to the dash cross member.

By doing so, when a collision load is applied on the front side frame by a frontal collision, the collision load is transmitted from the rear end of the front side frame to the dash cross member. Although the collision load is transmitted also to the first horizontal member adjacent to the dash cross member, deformation of the first horizontal member coward the vehicle compartment can be suppressed because the first horizontal member is supported by the first floor frame.

Further, it is preferable that the structure further includes a second floor frame that is installed on an upper face of the floor panel and extends in the longitudinal direction. In this case, it is favorable that the dash lower panel has a tilt part that tiles downward toward a rear. It is favorable that the front side frame has a curve part that curves downward along the tilt part of the dash lower panel. It is favorable that a rear end part of the curve part is coupled to the second floor frame.

By doing so, a collision load applied on the front side frame by a frontal collision can be transmitted to the second floor frame.

Further, it is preferable that the structure further includes: a second floor frame that is installed on an upper face of a floor panel and inside the side sill in the vehicle widthwise direction, and extends in the longitudinal direction; and an oblique brace that couples the side sill and the second floor frame to each other, and is disposed to tilt in such a way as to be located rearward as the oblique brace extends inward in the vehicle widthwise direction. In this case, it is favorable that the oblique brace is disposed behind the crushing space.

By doing so, since the vehicle-widthwise inner side of the side sill is supported by the oblique brace, the coupling portion between the side sill and the oblique brace has higher strength than the crushing space located ahead of this coupling portion. Thus, in the event of a small overlap collision or the like, the side sill can absorb collision energy by the local crush of the crushing space located ahead of the coupling portion between itself and the oblique brace, and thereby can favorably suppress deformation of an area behind the coupling portion between itself and the oblique brace.

In order to solve the above problems, another aspect of a vehicle body structure includes: a side sill that is placed on a vehicle-widthwise outer end part of a vehicle body and extends in a longitudinal direction; a front pillar that stands on a front end part of the side sill; and a jack up stiffener that is installed inside the side sill located below the front pillar. A front part of the jack up stiffener is fixed on the front pillar. A rear part of the jack up stiffener is fixed on the side sill while extending rearward of an intersection part between the side sill and the front pillar.

Accordingly, the rear part of the jack up stiffener is fixed on the side sill while extending rearward of the intersection part between the side sill and the front pillar. Thereby, the bend part of the front pillar, which is bent against a collision load in the event of a small overlap collision or the like, can be set behind the intersection part. This makes the front pillar less likely to fall rearward, and thus makes it possible to keep the shape of a door opening and inhibit a front side door from becoming hard to open.

According to the vehicle body structure of the embodiment It is possible to reduce acceleration of deceleration to be applied on an occupant.

Furthermore, a front pillar becomes less likely to fall rearward.

BRIEF DESCRIPTION OF THE DRAWINGS

The advantages of the disclosure will become apparent in the following description taken in conjunction with the following drawings.

DETAILED DESCRIPTION

Figure 1:
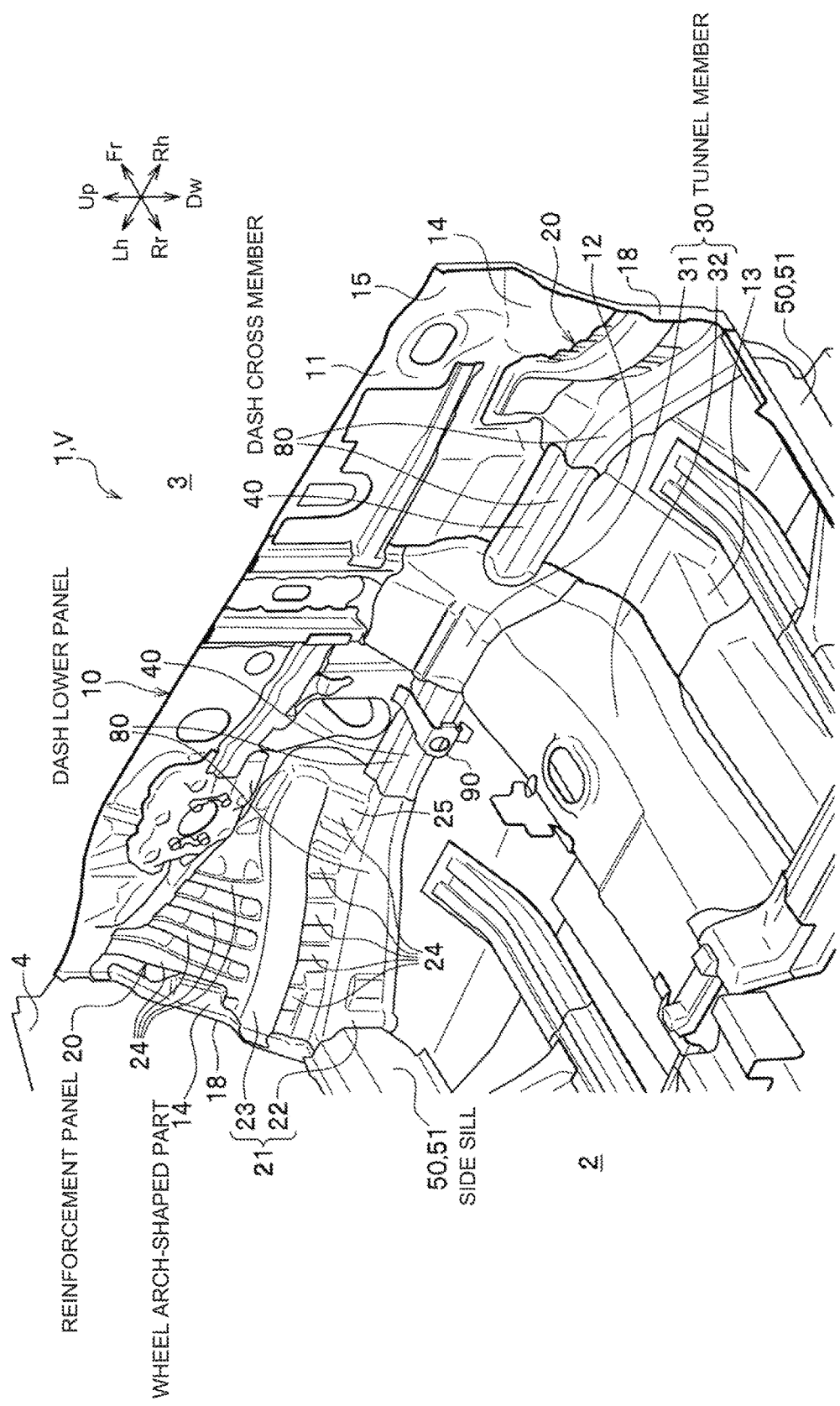
FIG. 1 is a perspective view illustrating a vehicle body structure according to an embodiment of the present invention that we see when looking down from above at the rear right.

An embodiment of the present invention is described in detail with reference to the drawings as needed. The same constituents are given the same reference numerals, and a redundant description thereof is omitted. Directions are described based on the front, rear, left, right, up, and down seen from a driver. In addition, a "vehicle widthwise direction" means the same as the "lateral direction".

Figure 2:
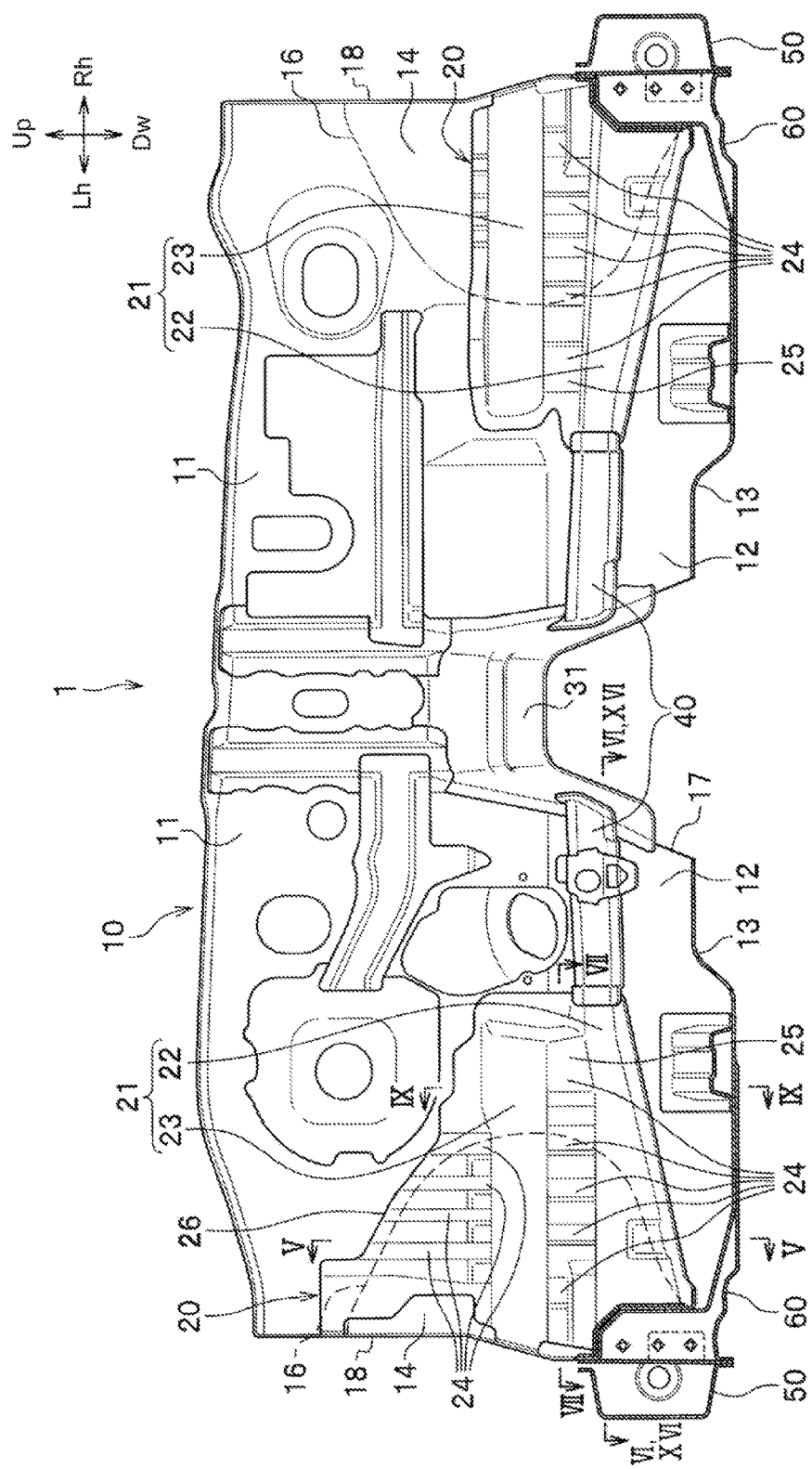
FIG. 2 is a rear view illustrating the vehicle body structure seen from behind.
Figure 3:
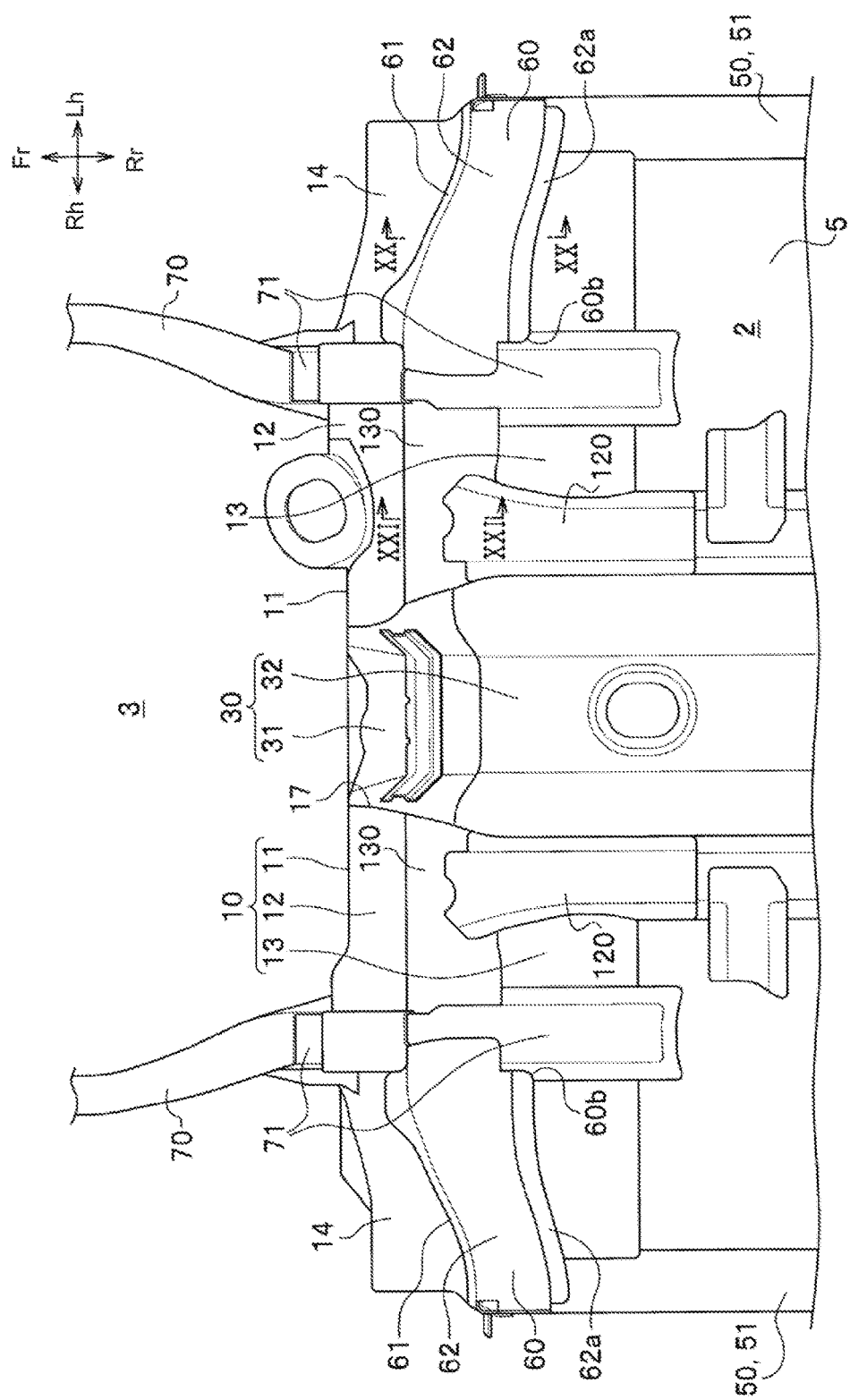
FIG. 3 is a bottom view illustrating the vehicle body structure that we see when looking up from below.

As illustrated in FIGS. 1, 2, and 3, an automobile V equipped with a vehicle body structure 1 according to the first embodiment mainly includes: a dash lower panel 10 forming a front end part of a vehicle compartment 2; reinforcement panels 20 covering a part of the dash lower panel 10 from the vehicle compartment 2 side; side sills 50 having front end parts respectively connected to vehicle-widthwise end parts of the dash lower panel 10 and extending in a longitudinal direction; a tunnel member 30 being connected to a vehicle-widthwise central part of the dash lower panel 10; and dash cross members 80 being placed on the dash lower panel 10 and constituting closed sections extending in the vehicle widthwise direction. Since the vehicle body structure 1 is formed substantially symmetrically, the left-side (driver's seat side) structure is mainly described in the following description.

The dash lower panel 10 is a platy member working as a partition between a power source device compartment 3 on the front side and the vehicle compartment 2 on the rear side, and is formed by bending a high-tensile steel plate into a predetermined shape by press forming, for example. The dash lower panel 10 mainly includes: front board parts 11 extending in the vertical direction and the vehicle widthwise direction; tilt parts 12 respectively extending rearward from the lower ends of the front board parts 11 while tilting downward; floor board parts 13 respectively extending rearward from the lower ends of the tilt parts 12 substantially horizontally; and a pair of wheel arch-shaped parts 14 being formed at its both vehicle-widthwise end parts. Note that, in the following description, portions other than the wheel arch-shaped parts 14 of the dash lower panel 10 are also referred to as a "general part 15".

The wheel arch-shaped parts 14 are a portion constituting a part of wheel arches (not illustrated) covering upper half parts of front wheels of the automobile V. Each wheel arch-shaped part 14 is formed to have a spherical shape bulging toward the vehicle compartment 2, and is provided to be laid over the front board part 11 and the tilt part 12. A ridge line part 16 being the boundary between the wheel arch-shaped part 14 and the general part 15 (mainly the front board part 11) is constituted of a bend line (ridge line) formed by bending the dash lower panel 10, and extends in an arc shape in a rear view (see FIG. 2).

In addition, the dash lower panel 10 has a concave notch part 17 opening downward at its vehicle-widthwise central part. The notch part 17 is formed to extend across the front board parts 11, the tilt parts 12, and the floor board parts 13. The tunnel member 30 to be described later is joined to the notch part 17.

Further, the dash lower panel 10 has dash flange parts 18 extending rearward respectively from its both vehicle-widthwise end parts. Each dash flange part 18 is formed to extend across the front board part 11, the wheel arch-shaped pert 14, the tilt part 12, and the floor board part 13. The side sill 50 and a front pillar lower 4 (see FIG. 8) are joined to the dash flange part 18. Besides, a floor panel 5 is joined to rear end parts of the floor board parts 13.

As illustrated in FIGS. 1, 2, and 4 to 7, the reinforcement panels 20 are paired left and right platy members designed to reinforce the respective wheel arch-shaped parts 14 by covering them from the vehicle compartment 2 side. Each reinforcement panel 20 is formed in a predetermined complex shape by creating a curve shape or an uneven shape on a high-tensile steel plate by hot stamp forming, for example. An indoor-side end part of the reinforcement panel 20 extends beyond the wheel arch-shaped part 14 and covers a part of the front board part 11 and the tilt part 12 from the vehicle compartment 2 side. The reinforcement panel 20 has: a horizontal closed section part 21 extending in the vehicle widthwise direction; and a vertical closed section part 24 extending in the vertical direction.

The horizontal closed section part 21 is a portion that forms closed sections, extending in the vehicle widthwise direction, in cooperation with the wheel arch-shaped part 14. The horizontal closed section part 21 is formed by making a part of the reinforcement panel 20 bulge toward the vehicle compartment 2. In this embodiment, the horizontal closed section part 21 is constituted of: a first horizontal closed section part 22 located on the lower side; and a second horizontal closed section part 23 placed above the first horizontal closed section part 22 with a space therebetween. In this respect, the number of horizontal closed section parts 21 is not particularly limited.

Figure 4:
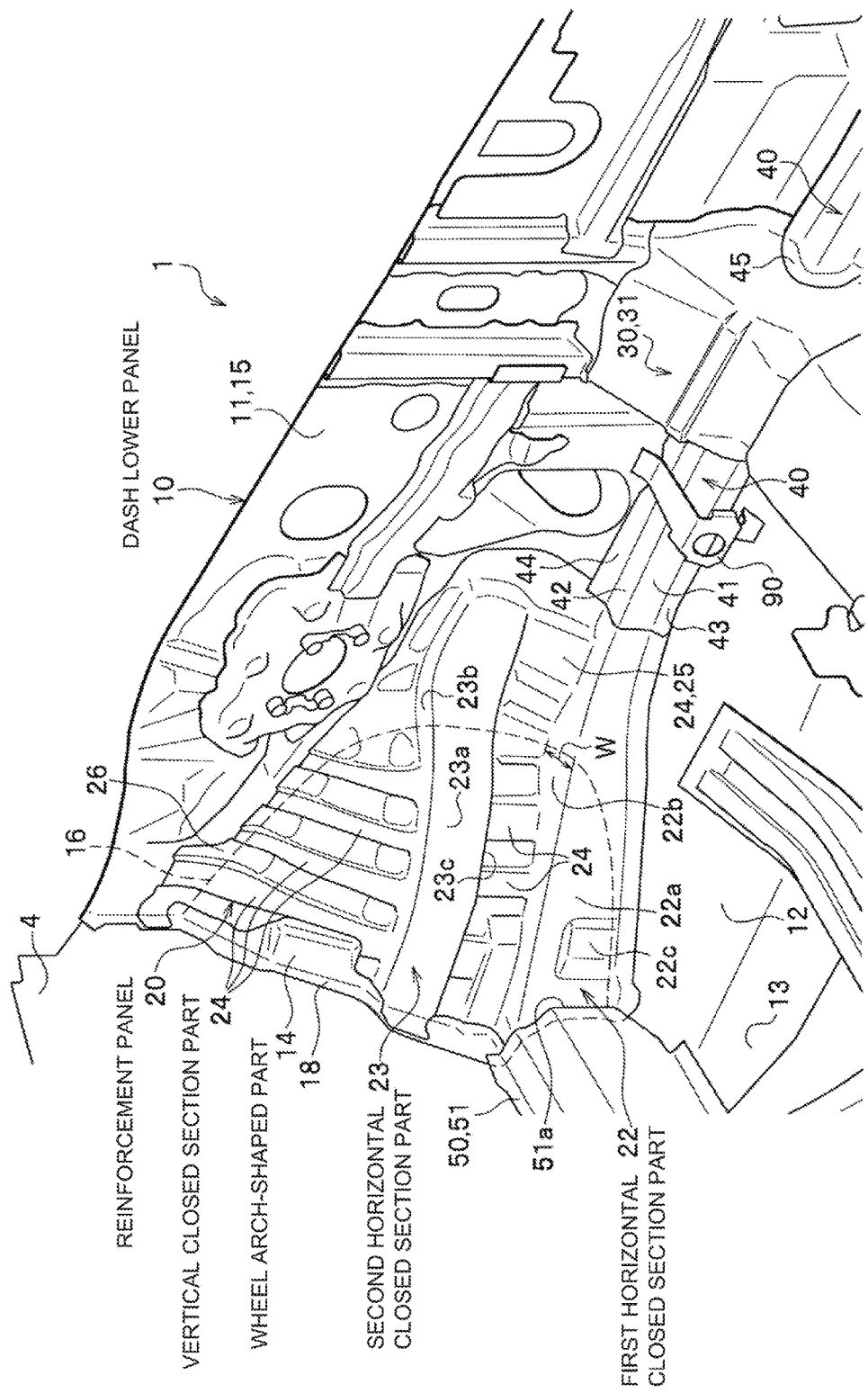
FIG. 4 is a perspective view illustrating a left half part of the vehicle body structure of FIG. 1 in an enlarged manner.
Figure 5:
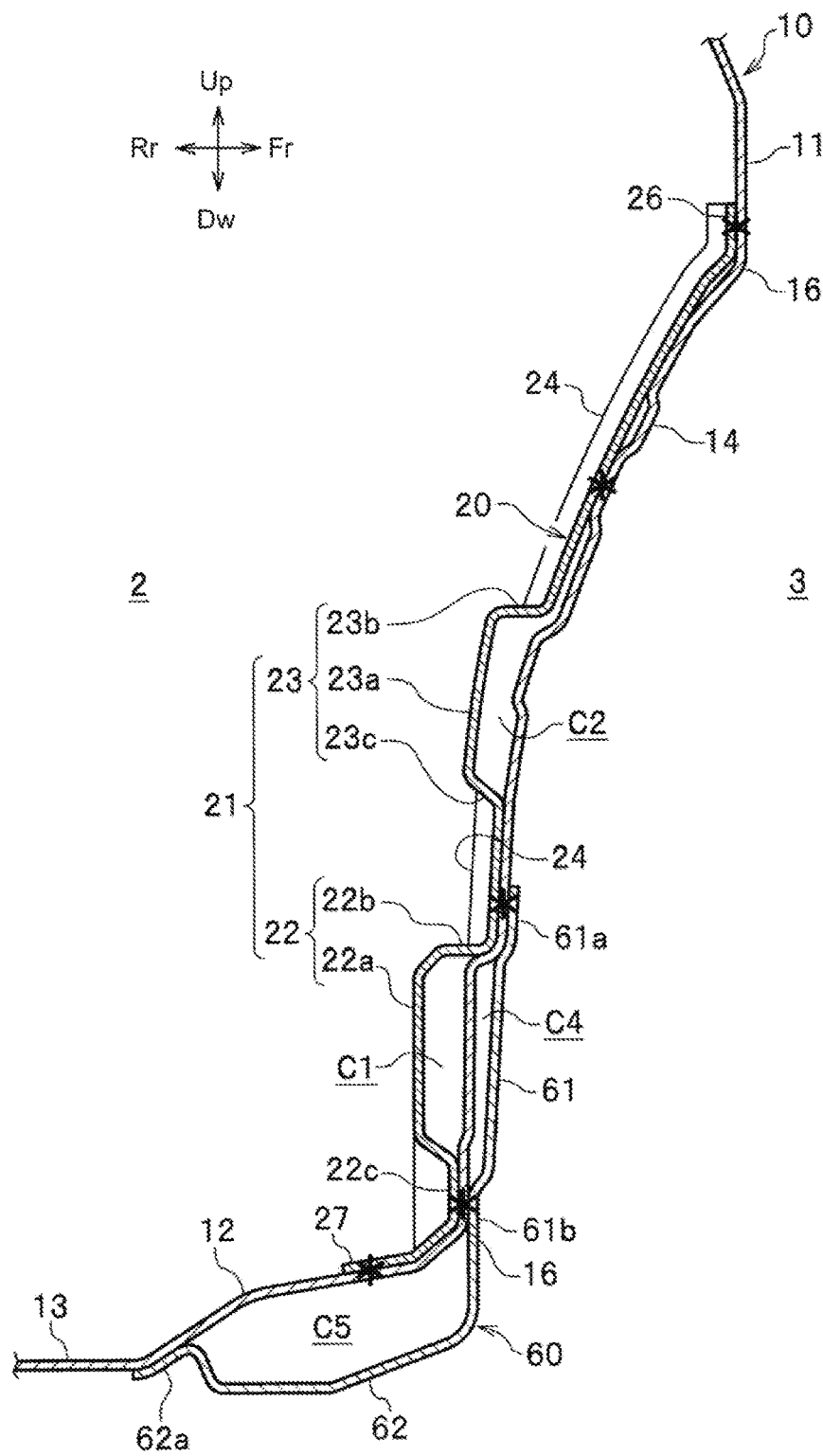
FIG. 5 is a vertical sectional view taken along the line V-V in FIG. 2.
Figure 6:
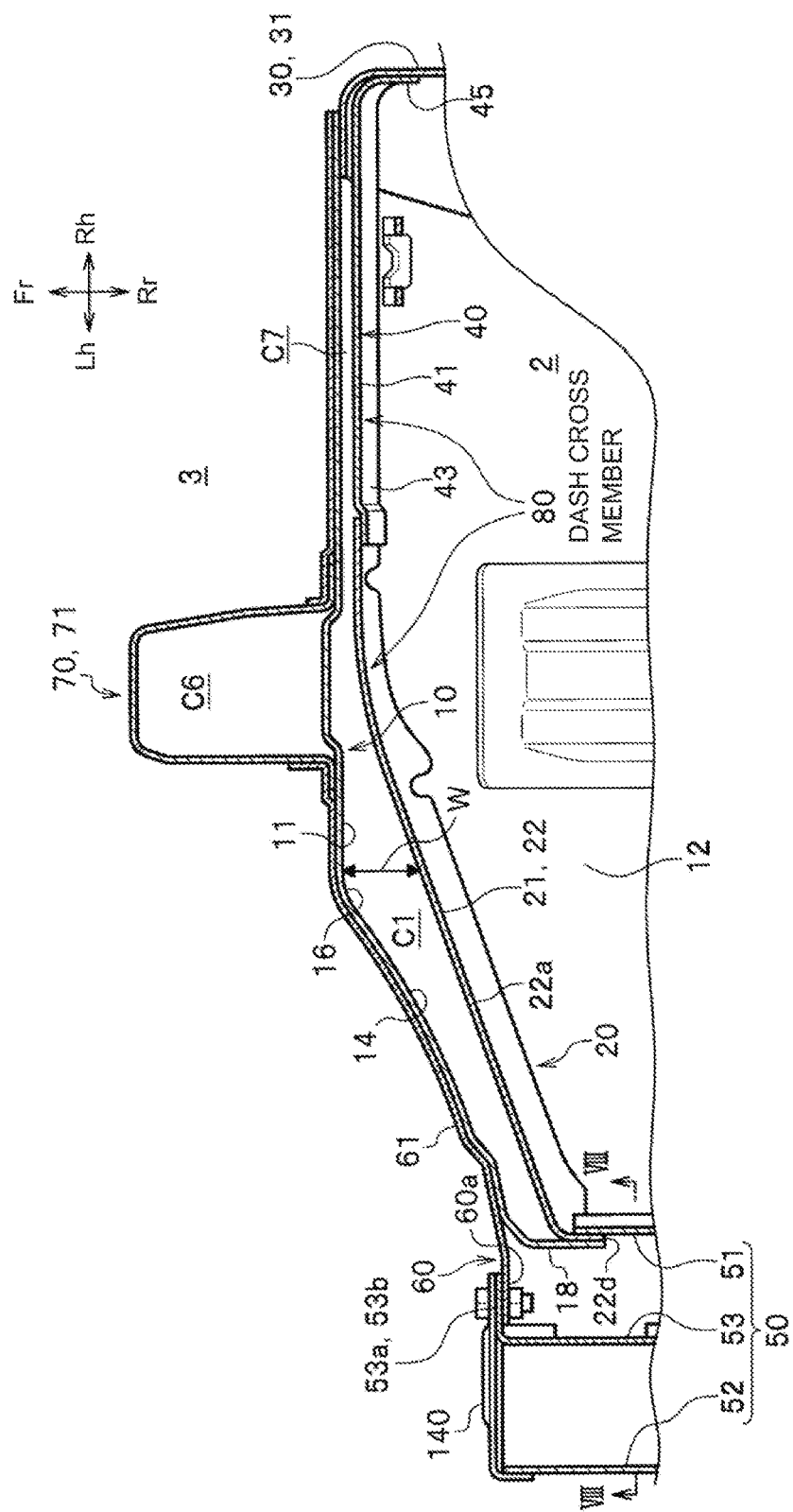
FIG. 6 is a horizontal sectional view taken along the line VI-VI in FIG. 2.

As illustrated in FIGS. 4, 5, and 6, the first horizontal closed section part 22 is formed to substantially have an inverse L-shape in a vertical sectional view, and has: a vertical wall part 22*a* extending in the vertical direction; and an upper wall part 22*b* extending forward from the upper end of the vertical wall part 22*a*. The first horizontal closed section part 22 extends along the lower-side ridge line part 16 being the boundary between the wheel arch-shaped part 14 and the tilt part 12. The reinforcement panel 20 is joined to the dash lower panel 10 by spot welding, for example, at the upper and lower sides of the first horizontal closed section part 22. This forms a first horizontal closed section C1 surrounded by the first horizontal closed section part 22 and the wheel arch-shaped part 14, which reinforces a lower part of the wheel arch-shaped part 14. In addition, a concave part 22*c* for welding is provided near a vehicle exterior-side end part of the vertical wall part 22*a*. A horizontal flange part 22*d* formed to curve rearward is provided at a vehicle-widthwise outer end part of the first horizontal closed section part 22. The horizontal flange part 22*d* is joined to the dash flange part 18 from the vehicle compartment 2 side.

As illustrated in FIGS. 4 and 5, the second horizontal closed section part 23 is formed to have a groove shape that is open forward in a vertical sectional view, and has: a vertical wall part 23*a* extending in the vertical direction; an upper wall part 23*b* extending forward from the upper end of the vertical wall part 23*a;* and a lower wall part 23*c* extending forward from the lower end of the vertical wall part 23*a*. The second horizontal closed section part 23 extends in the vehicle widthwise direction along a substantially middle position of the wheel arch-shaped part 14 in the vertical direction. The reinforcement panel 20 is joined to the dash lower panel 10 by spot welding, for example, at the upper and lower sides of the second horizontal closed section part 23 (see * marks in FIG. 5). This forms a second horizontal closed section C2 surrounded by the second horizontal closed section part 23 and the wheel arch-shaped part 14, which reinforces an intermediate part of the wheel arch-shaped part 14.

Figure 7:
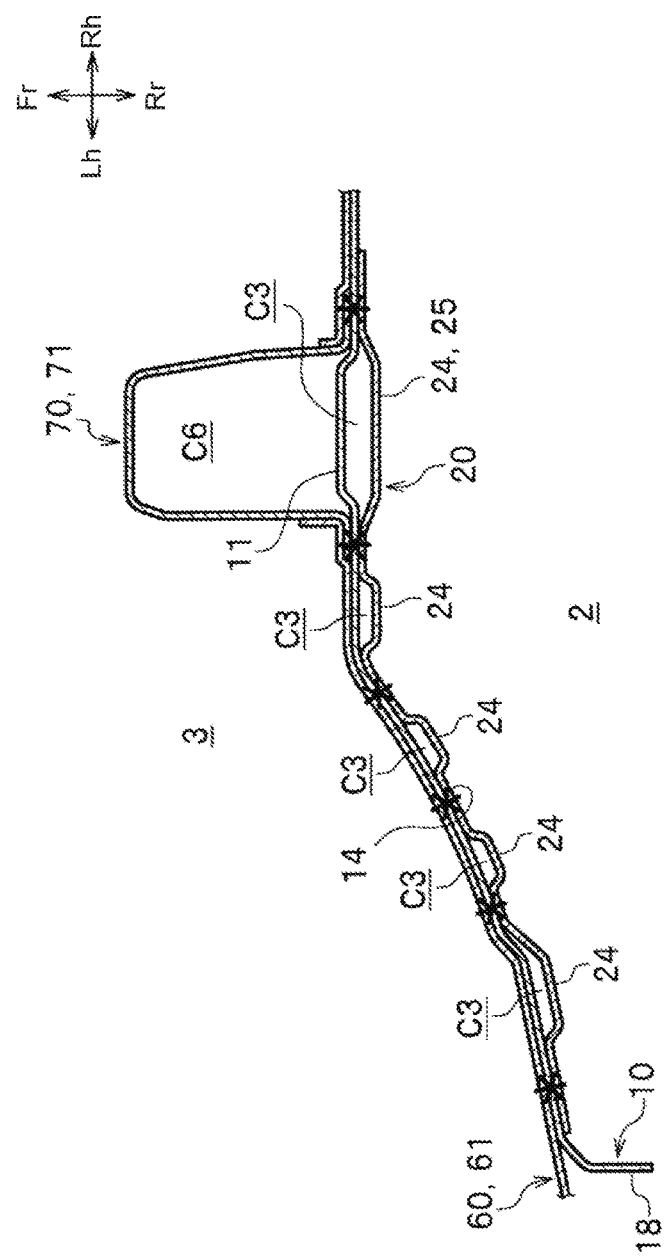
FIG. 7 is a horizontal sectional view taken along the line VII-VII in FIG. 2.

As illustrated in FIGS. 4 and 7, the vertical closed section part 24 is a portion that forms vertical closed sections C3, extending in the vertical direction, in cooperation with the wheel arch-shaped part 14. The vertical closed section part 24 is formed by making a part of the reinforcement panel 20 bulge toward the vehicle compartment 2. In this embodiment, the vertical closed section part 24 is constituted of multiple vertical closed section parts 24 spaced apart from one another in the vehicle widthwise direction. The number of vertical closed section parts 24 is not particularly limited.

Each vertical closed section part 24 is formed to have a groove shape that is open forward in a horizontal sectional view. The amount of bulge (groove depth) of the vertical closed section part 24 is smaller than that of the horizontal closed section part 21.

Note that, in the following description, the vertical closed section part 24 located at the innermost of the multiple vertical closed section parts 24 in the vehicle widthwise direction is also referred to as an "innermost vertical closed section part 25".

Each vertical closed section part 24 intersects with the horizontal closed section part 21 (at right angle in this embodiment). Specifically, each vertical closed section part 24 extends from the upper wall part 22*b* of the first horizontal closed section part 22 to the lower wall part 23*c* of the second horizontal closed section part 23. In addition, the vertical closed section parts 24 other than the innermost vertical closed section part 25 extends from the upper wall part 23*b* of the second horizontal closed section part 23 to an upper edge part 26 of the reinforcement panel 20. The innermost vertical closed section part 25 has a width dimension larger than other vertical closed section parts 24.

As illustrated in FIG. 7, the reinforcement panel 20 is joined to the dash lower panel 10 by spot welding, for example, at both left and right sides of each vertical closed section part 24 (see * marks in FIG. 7). This forms the multiple vertical closed sections C3 surrounded by the vertical closed section parts 24 and the wheel arch-shaped part 14, which reinforces the wheel arch-shaped part 14 in the vertical direction. In addition, as illustrated in FIGS. 4 and 5, the upper edge part 26 of the reinforcement panel 20 is joined to the front board part 11 at a position above the ridge line part 16 being the boundary between the front board part 11 and the wheel arch-shaped part 14 (outside the wheel arch-shaped part 14). Thereby, the ridge line part 16 is reinforced by the reinforcement panel 20. As illustrated in FIGS. 4 and 5, a lower edge part 27 of the reinforcement panel 20 is joined to the tilt part 12 at a position below the ridge line part 16 being the boundary between the wheel arch-shaped part 14 and the tilt part 12 (outside the wheel arch-shaped part 14). Thereby, the ridge line part 16 is reinforced by the reinforcement panel 20.

As illustrated in FIGS. 1, 2, and 3, the tunnel member 30 is connected to the vehicle-widthwise central part (notch part 17) of the dash lower panel 10. The tunnel member 30 is a member formed to curve in a groove shape (tunnel/inverse U shape) being open downward and protruding upward, and extends in the longitudinal direction. Inside (below) the tunnel member 30, a propeller shaft, an exhaust pipe, and the like (not illustrated) are housed. The tunnel member 30 is constituted of three members including: a front tunnel member 31 disposed on the front side; a rear tunnel member 32 coupled to the rear end of the front tunnel member 31; and a tunnel closed section forming member 33 joined to a face of the front tunnel member 31 opposite the vehicle compartment 2 (such a face is hereinafter also referred to as a "back face"). The tunnel member 30 will be described in detail later.

As illustrated in FIGS. 1, 4, and 6 (mainly FIG. 4), a second horizontal member 40, formed separately from the reinforcement panel 20, is installed between the reinforcement panel 20 and the tunnel member 30.

The second horizontal member 40 is a member constituting what is called the dash cross member 80 together with the first horizontal closed section part 22 being located on the lowermost side of the horizontal closed section part 21. The second horizontal member 40 is formed by bending a high-tensile steel plate into a predetermined shape by hot stamp forming, for example. The second horizontal member 40 is formed to substantially have an inverse L shape in the vertical sectional view, and includes: a horizontal member vertical wall part 41 extending in the vertical direction; a horizontal member upper wall part 42 extending forward from the upper end of the horizontal member vertical wall part 41; a horizontal member lower flange part 43 extending downward and rearward from the lower end of the horizontal member vertical wall part 41; a horizontal member upper flange part 44 extending upward and forward from the front end of the horizontal member upper wall part 42; and a horizontal member end part-flange part 45 extending toward the vehicle compartment 2 along a sidewall of the tunnel member 30 from an end part of the second horizontal member 40 on the vehicle-widthwise inner side (on the tunnel member 30 side).

The horizontal member lower flange part 43 is joined to the tilt part 12 of the dash lower panel 10. The horizontal member upper flange part 44 is joined to the front board part 11 of the dash lower panel 10. The horizontal member end part-flange part 45 is joined to the side wall of the front tunnel member 31. In addition, a vehicle-widthwise outer end part of the second horizontal member 40 is joined to a vehicle-widthwise inner end part of the first horizontal closed section part 22. Further, the front end part of the side sill 50 to be described later is joined to the vehicle-widthwise outer end part of the first horizontal closed section part 22. A closed section C7 formed by the second horizontal member 40 is continuous to the closed section C1 formed by the first horizontal closed section part 22. The dash cross member 80 connects the front end part of the side sill 50 and a front end part of the tunnel member 30. In other words, a vehicle exterior-side end part of the dash cross member 80 is supported by the front end part of the side sill 50, and a central part of the dash cross member 80 is supported by the front end part of the tunnel member 30.

The dash cross member 80 will be described in detail later.

Figure 8:
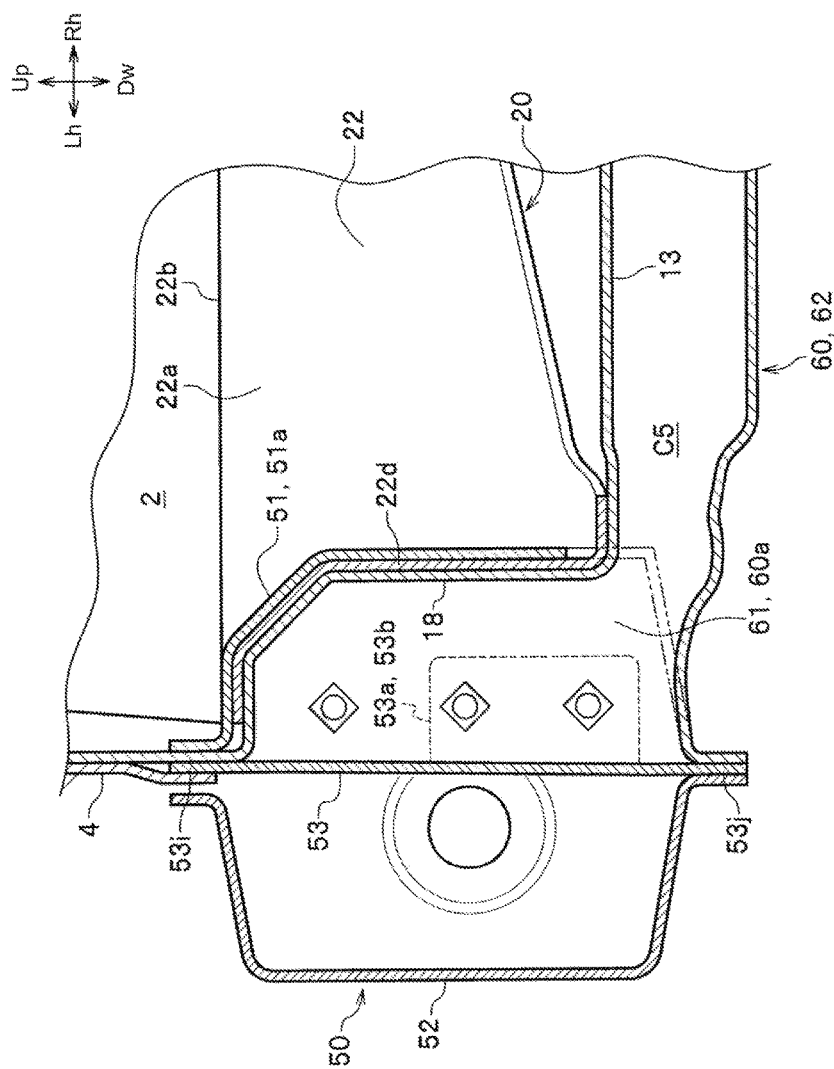
FIG. 8 is a vertical sectional view taken along the line VIII-VIII in FIG. 6.

As illustrated in FIGS. 4, 6, and 8, the front end parts of the side sills 50 are joined to the vehicle-widthwise end parts (left and right end parts) of the dash lower panel 10. Each side sill 50 is a hollow member extending in the longitudinal direction, and is constituted of: a side sill inner panel 51 located on the vehicle compartment 2 side; and a side sill outer panel 52 located on the vehicle exterior side. In addition, a jack up stiffener 53 extending in the longitudinal direction between the side sill inner panel 51 and the side sill outer panel 52 is installed in the front end part of the side sill 50.

In this respect, as illustrated in FIG. 8, the front pillar lower 4 is also joined to the dash flange part 18 that is placed in the vehicle-widthwise end part of the dash lower panel 10. The side sill 50 couples a lower end part of the front pillar lower 4 and a lower end part of a center pillar (not illustrated) to each other.

As illustrated in FIG. 8, the side sill inner panel 51 is basically formed to have a groove shape (hat shape) that is open on the vehicle exterior side in the sectional view. A front end part 51a of the side sill inner panel 51 is laid on the horizontal flange part 22d of the first horizontal closed section part 22 from the vehicle compartment 2 side, and the front end part 51a of the side sill inner panel 51, the horizontal flange part 22d, and the dash flange part 18 are joined together (three-sheet joining) by spot welding. Here, the front end part 51a of the side sill inner panel 51 is disposed behind and opposite the vertical wall part 22a of the first horizontal closed section part 22 (see FIGS. 4 and 6). Hence, even if the side sill inner panel 51 and the horizontal flange part 22d are detached from each other at the time of a collision from the front, the vertical wall part 22a of the first horizontal closed section part 22 comes into contact with the front end part 51a of the side sill inner panel 51.

The jack up stiffener 53 is a member designed to reinforce the side sill 50 and support a load applied during jack-up. An upper end part 53i and a lower end part 53j of the jack up stiffener 53 are each pinched between the side sill inner panel 51 and the side sill outer panel 52. A stiffener flange part 53a formed to bend inward in the vehicle widthwise direction is placed at a front end part of the jack up stiffener 53.

As illustrated in FIGS. 3 and 5, outriggers 60 extending in the vehicle widthwise direction are joined to the dash lower panel 10 on the power source device compartment 3 side.

Each outrigger 60 is formed by bending a high-tensile steel plate into a predetermined shape by hot stamp forming, for example. The outrigger 60 extends in the vehicle widthwise direction opposite the first horizontal closed section part 22 with the dash lower panel 10 interposed therebetween. In other words, the outrigger 60 covers the ridge line part 16, located on the lower side of the wheel arch-shaped part 14, from the power source device compartment 3 side. The outrigger 60 forms a closed section, extending in the vehicle widthwise direction, in cooperation with the dash lower panel 10. A vehicle-widthwise outer end part 60a (see FIG. 6) of the outrigger 60 extends beyond a vehicle-widthwise outer end part of the dash lower panel 10 (dash flange part 18) and is joined to the stiffener flange part 53a of the jack up stiffener 53. A vehicle-widthwise inner end part of the outrigger 60 is joined to an outer face of a curve part 71 of one of front side frames 70 to be described later.

As illustrated in FIG. 5, the outrigger 60 is formed to substantially have an L shape in the vertical sectional view, and has: an outrigger vertical wall part 61 extending in the vertical direction; and an outrigger bottom wall part 62 extending rearward from the lower end of the outrigger vertical wall part 61. An outrigger upper flange part 61a substantially having an L shape in the sectional view is formed in an upper end part of the outrigger vertical wall part 61. The outrigger upper flange part 61a is disposed between the first horizontal closed section part 22 and the second horizontal closed section part 23, end joined to the reinforcement panel 20 with the wheel arch-shaped part 14 interposed therebetween (three-sheet joining) (see * mark in FIG. 5). In addition, at a position below the first horizontal closed section part 22 (near the ridge line part 16 located on the lower side of the wheel arch-shaped part 14), an intermediate part 61b of the outrigger vertical wall part 61 in the vertical direction is joined to the concave part 22c of the first horizontal closed section part 22 with the wheel arch-shaped part 14 interposed therebetween (three-sheet joining). A portion between the outrigger upper flange part 61a of the outrigger vertical wall part 61 and the intermediate part 61b is spaced apart from a front face of the wheel arch-shaped part 14. Thereby, an outrigger first closed section C4 extending in the vehicle widthwise direction is formed by the wheel arch-shaped part 14 and the outrigger vertical wall part 61 at a position in front of the first horizontal closed section part 22 (opposite the first horizontal closed section pert with the dash lower panel 10 interposed therebetween). In other words, the first horizontal closed section C1 and the outrigger first closed section C4 together form one closed section having a large sectional area.

A lower end part of the outrigger vertical wall part 61 is disposed below the ridge line part 16 located on the lower side of the wheel arch-shaped part 14. In addition, the outrigger bottom wall part 62 is disposed below the tilt part 12. An outrigger lower flange part 62a substantially having an inverse L shape in the sectional view is formed in a rear end part of the outrigger bottom wall part 62. The outrigger lower flange part 62a is joined to an area near a boundary part between the tilt part 12 and the floor board part 13. Thus, an outrigger second closed section C5 is formed by the dash lower panel 10 and the outrigger bottom wall part 62. Thereby, the front side frame 70 to be described later and the side sill 50 are coupled together by a hollow structure forming the outrigger first closed section C4 and the outrigger second closed section C5.

Figure 20:
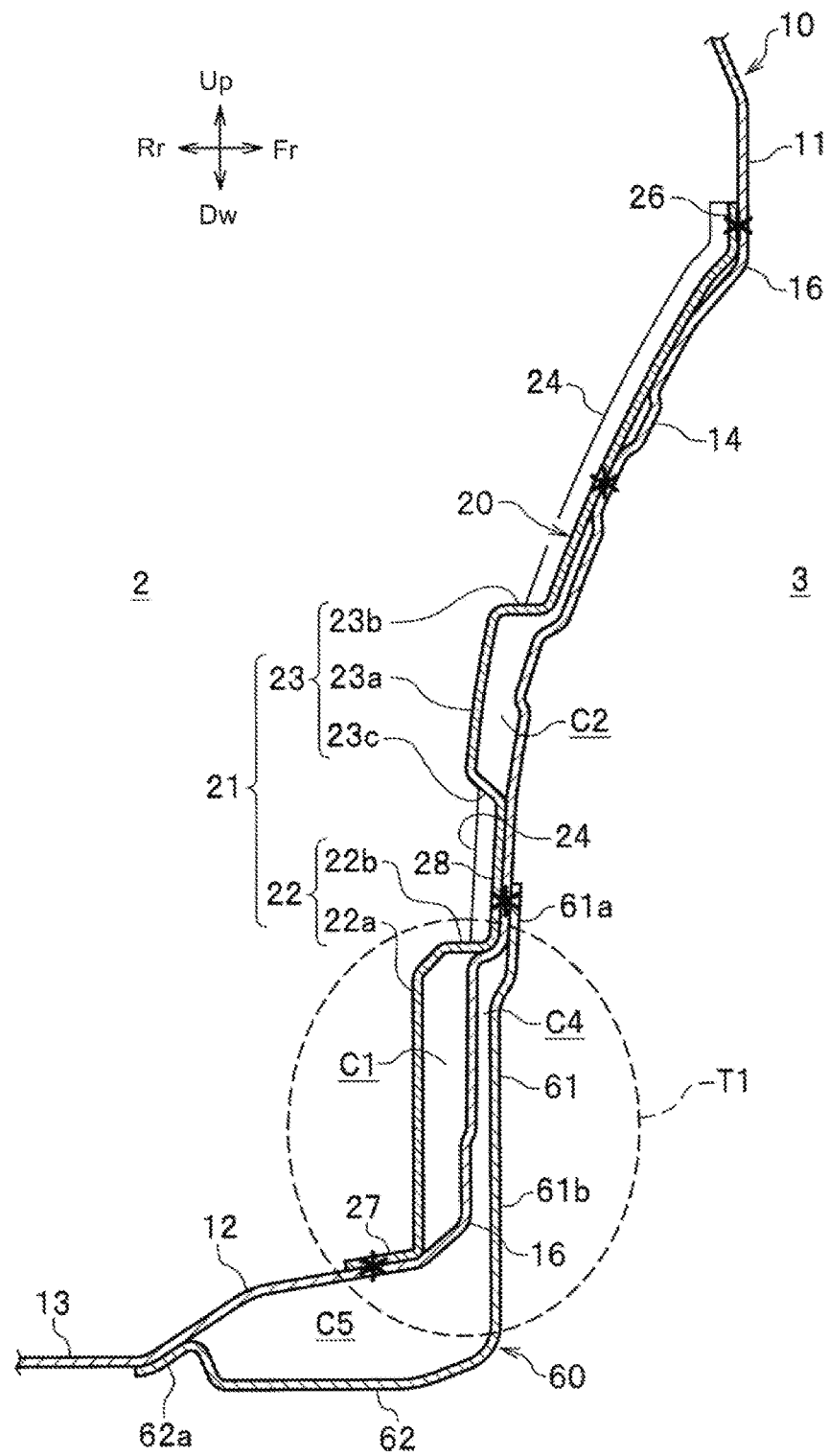
FIG. 20 is a vertical sectional view taken along the line XX-XX in FIG. 3.

In this respect, as illustrated in FIG. 20, in an area having no concave part 22c, the intermediate part 61b of the outrigger vertical wall part 61 in the vertical direction is not joined to the wheel arch-shaped part 14 and the first horizontal closed section part 22. A portion of the outrigger vertical wall part 61 other than the outrigger upper flange part 61a is spaced apart from the front face of the wheel arch-shaped part 14. Thereby, the outrigger first closed section C4 and the outrigger second closed section C5 are continuous to each other.

Figure 9:
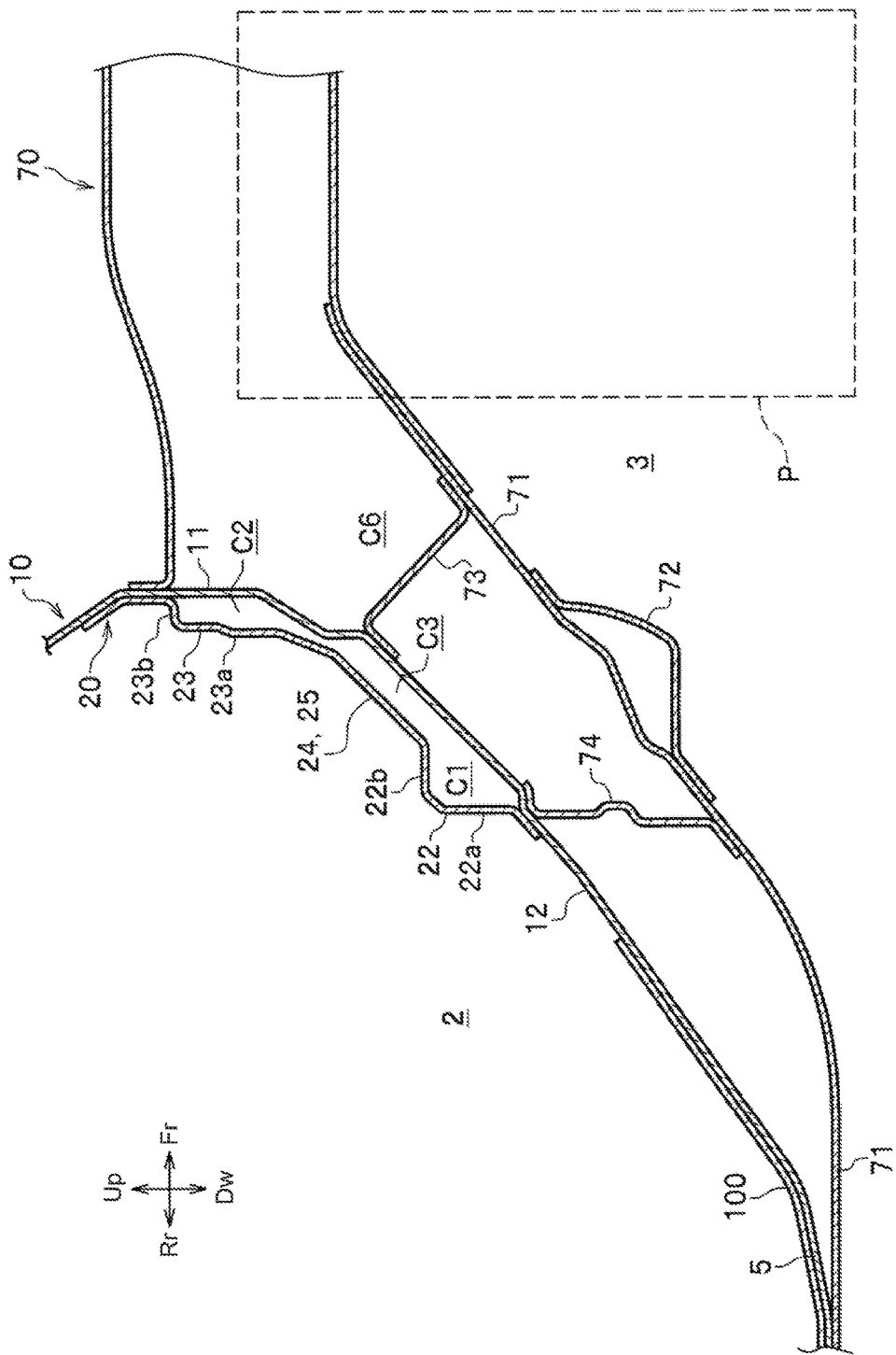
FIG. 9 is a vertical sectional view taken along the line IX-IX in FIG. 2.

As illustrated in FIGS. 3 and 9, the pair of front side frames 70 extending in the longitudinal direction is joined to the dash lower panel 10 on the power source device compartment 3 side.

The paired front side frames 70 are hollow frame members formed to substantially have a square cylindrical shape, and are designed to support a power source device P, such as an engine, disposed between the front side frames 70 themselves. Front end parts of the respective front side frames 70 are joined respectively to both left and right end parts of a bumper beam (not illustrated). A rear end part of each front side frame 70 is joined to the front board part 11 and the tilt part 12 of the dash lower panel 10 from the power source device compartment 3 side. More specifically, the curve part 71 curving downward along the front board part 11 and the tilt part 12 is placed in the rear end part of the front side frame 70. The curve part 71 is formed to have a groove shape (hat shape) that is open rearward (or upward) in the sectional view. By being joined to the dash floor panel 10, the curve part 71 forms a front closed section C6, extending in the longitudinal direction, in cooperation with the front board part 11 and the tilt part 12. The innermost vertical closed section part 25 of the reinforcement panel 20 is disposed opposite the curve part 71 (more specifically an upper half part of the curve part 71) with the dash lower panel 10 interposed therebetween. While a rear end part of the curve part 71 is laid on a second floor frame 100 from below with the floor panel 5 interposed therebetween, they are joined together (three-sheet joining) by spot welding.

An attachment part 72 for a mounting part (not illustrated) of the power source device P to be attached thereto is joined to a lower face of the curve part 71. In addition, a pair of stiffeners 73, 74 is placed inside the curve part 71 and ahead of and behind the attachment part 72. The stiffeners 73, 74 are platy members for reinforcement and partition the front closed section C6 into front and rear parts. Upper and lower end parts of each of the stiffeners 73, 74 are joined respectively to the dash lower panel 10 and the curve part 71.

As illustrated in FIGS. 4 and 6, a longitudinal width dimension W of the upper wall part 22b of the first horizontal closed section part 22 is the largest at a portion corresponding to the ridge line part 16 which is the boundary between the tilt part 12 being included in the general part 15 and the wheel arch-shaped port 14. More specifically, a rear end part of the upper wall part 22b (that is, the vertical wall part 22a) extends substantially linearly in such a way as to be located rearward as it extends outward in the vehicle widthwise direction. Meanwhile, a front end part of the upper wall part 22b is formed along the shape of rear faces of the tilt part 12 and the wheel arch-shaped part 14. The tilt part 12 opposed to the front end part of the upper wall part 22b extends in a direction substantially orthogonal to the longitudinal direction (parallel with the lateral direction). Further, the wheel arch-shaped part 14 opposed to the front end part of the upper wall part 22b projects in an arc shape toward the vehicle compartment 2 in such a way as to be located rearward as it extends outward in the vehicle widthwise direction. Accordingly, at the ridge line part 16 being the boundary between the wheel arch-shaped part 14 and the tilt part 12, the distance between the dash cross member 80 and the vertical wall part 22a is the largest, and thus the longitudinal dimension of the upper wall part 22b is the largest.

Next, structures of the tunnel member 30 and the dash cross member 80 are described in detail with reference mainly to FIGS. 10 to 15.

As illustrated in FIGS. 10 to 14, the front tunnel member 31 is a member formed by bending a general steel plate with lower strength than a high-tensile steel plate into a downward opening groove shape by press forming, for example. The front tunnel member 31 includes: a front tunnel upper wall part 31a constituting an upper wall; a front tunnel left wall part 31b and a front tunnel right wall part 31c extending downward from left and right end parts of the front tunnel upper wall part 31a respectively and constituting sidewalls and front tunnel flange parts 31d being formed to curve at front end parts and lower end parts of these upper wall and sidewalls. The front tunnel upper wall part 31a tilts in such a way as to be located upward as it extends forward. The front tunnel upper wall part 31a has a bead-shaped part 31e extending in the vehicle widthwise direction at a central part in the longitudinal direction. The bead-shaped part 31e has a convex face on the vehicle compartment 2 side and a concave face on the side opposite the vehicle compartment 2 (see FIG. 14). In this embodiment, the front tunnel left wall part 31b and the front tunnel right wall part 31c are formed flat. The front tunnel flange parts 31d are joined to an edge part of the notch part 17.

The rear tunnel member 32 is a member constituting a main body of the tunnel member 30. The rear tunnel member 32 is a member formed by bending a high-tensile steel plate into a downward opening groove shape by hot stamp forming, for example, and extends substantially horizontally. A vehicle-widthwise inner end part of the floor panel is joined to left and right lower end parts of the rear tunnel member 32.

Here, hot stamp forming is also called hot press forming, and is a forming method such that a steel plate softened by heating is subjected to press working and at the same time subjected to quenching by means of a cooling effect brought about by the contact with a die. This method is characterized in that softening by heating suppresses spring back of the steel plate and improves dimensional accuracy, and quenching increases the strength of the member.

Figure 12:
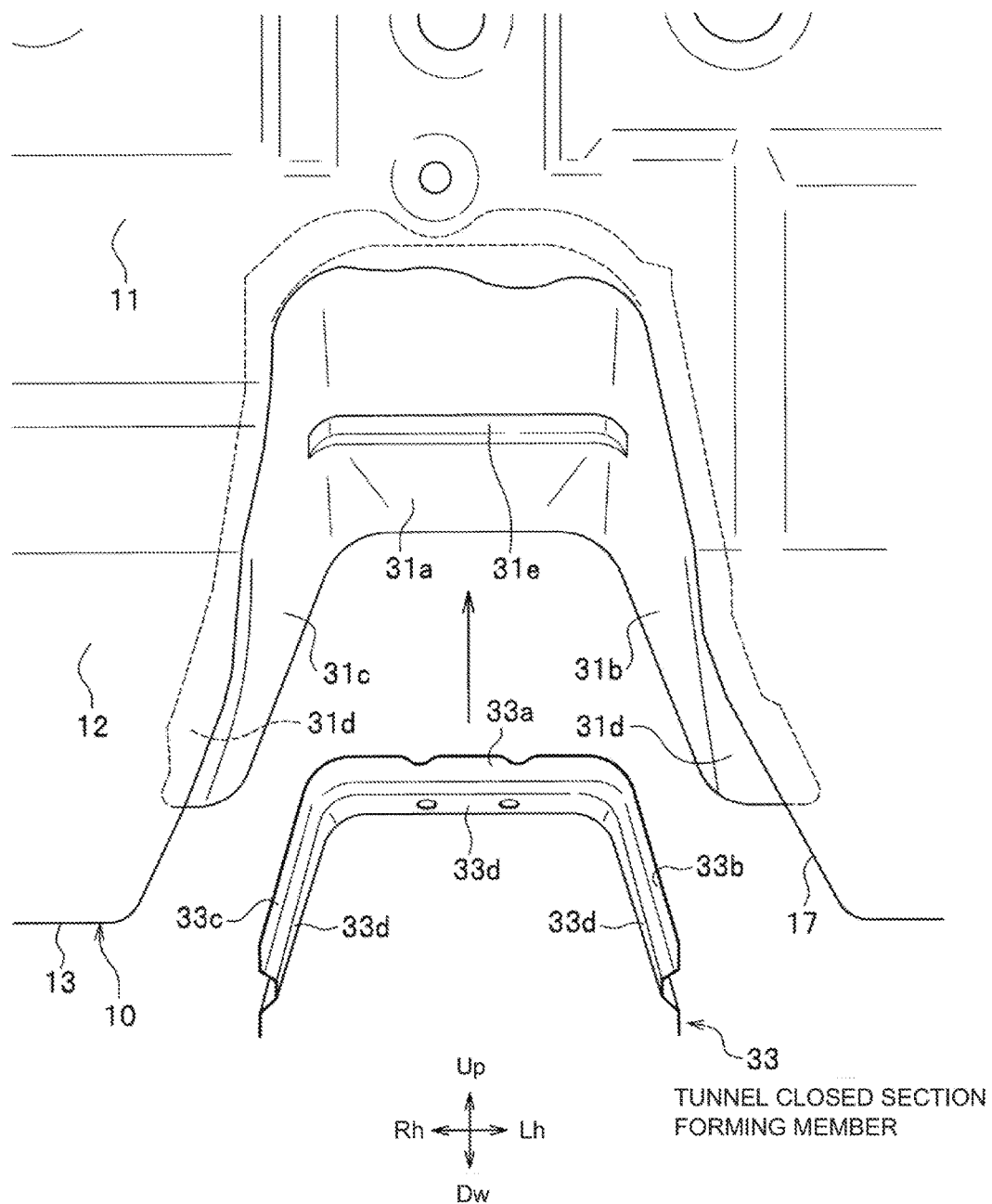
FIG. 12 is a front view illustrating the front tunnel member seen from ahead, in which a tunnel closed section forming member is illustrated separately.
Figure 13:
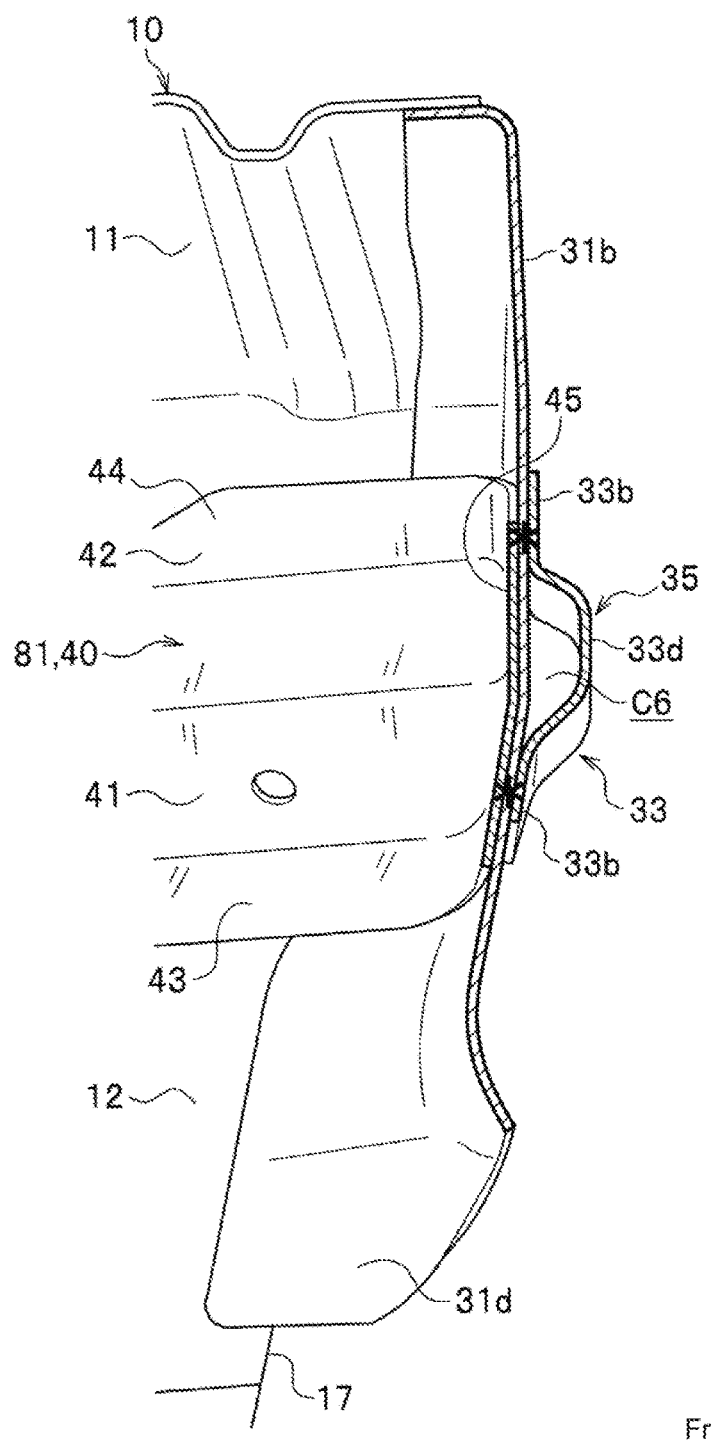
FIG. 13 is a substantially horizontal sectional view taken along the line XIII-XIII in FIG. 11.
Figure 14:
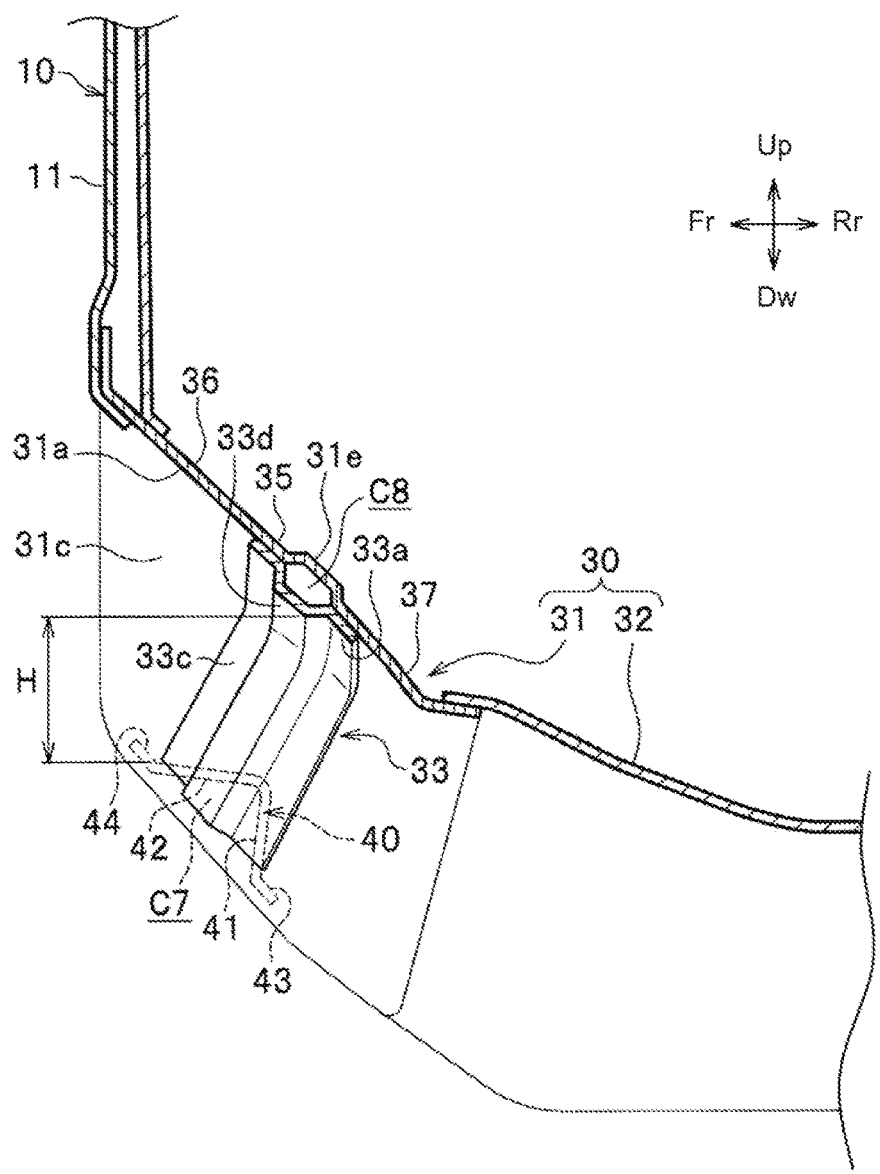
FIG. 14 is a vertical sectional view taken along the line XIV-XIV in FIG. 10.

As illustrated in FIGS. 12 to 14, the tunnel closed section forming member 33 is a strip-shaped member having a longitudinal width smaller than the front tunnel member 31. The tunnel closed section forming member 33 is formed by bending a long and narrow strip-shaped high-tensile steel plate into an inverse U shape by press forming, for example. The tunnel closed section terming member 33 has: an upper strip part 33a joined to a back face of the front tunnel upper wall part 31a; a left strip part 33b joined to a back face of the front tunnel left wall part 31b; a right strip part 33c joined to a back face of the front tunnel right wall part 31c; and a bead-shaped part 33d having a concave face on the front tunnel member 31 side and a convex face on the opposite side. The tunnel closed section forming member 33 is joined to a central part of the front tunnel member 31 in the longitudinal direction.

The bead-shaped part 33d is continuously formed in a central part in the widthwise direction of the tunnel closed section forming member 33 across the entire length in the lengthwise direction thereof. When the tunnel closed section forming member 33 is joined to the front tunnel member 31, the bead-shaped part 33d is located away from the back face of the front tunnel member 31 and forms a closed section C8. Thereby, a tunnel closed section part 35 that continues in the vehicle widthwise direction from the front tunnel left wall part 31b to the front tunnel right wall part 31c via the front tunnel upper wall part 31a is formed in the central part of the front tunnel member 31 in the longitudinal direction. The tunnel closed section part 35 constitutes a part of a central part of the dash cross member 80 to be described later.

Meanwhile, a front fragile part 36 and a rear fragile part 37 are formed in areas of the front tunnel member 31 in front of and behind a portion to which the tunnel closed section forming member 33 is joined (that is, the tunnel closed section part 35). Since the front fragile part 36 and the rear fragile part 37 are made of a sheet of general steel plate, for example, their compressive strength against a load from the front is smaller than that of the rear tunnel member 32 as a tunnel body part. In addition, since the front fragile part 36 and the rear fragile part 37 are not reinforced by the tunnel closed section forming member 33, their compressive strength is smaller than that of the tunnel closed section part 35.

As illustrated in FIG. 13, a lower end part of the left strip part 33b is joined, at both front and rear sides of the bead-shaped part 33d, to the left-side horizontal member end part-flange part 45 with the front tunnel left wall part 31b interposed therebetween (three-sheet joining). Although not illustrated, a lower end part of the right strip part 33c is likewise joined, at both front and rear sides of the bead-shaped part 33d, to the right-side horizontal member end part-flange part 45 with the front tunnel right wall part 31c interposed therebetween (three-sheet joining). In other words, the second horizontal members 40 arranged at both left and right sides of the front tunnel member 31 are coupled together by the tunnel closed section forming member 33.

In addition, as illustrated in FIG. 14, the upper strip part 33a is joined along the bead-shaped part 31e of the front tunnel upper wall part 33a. Thereby, the bead-shaped part 33d of the upper strip part 33a is disposed opposed to the bead-shaped part 31e of the front tunnel upper wall part 31a. This increases the sectional area of a portion of the tunnel closed section part 35 corresponding to the front tunnel upper wall part 31a, and thus increases the rigidity and strength of this portion.

As illustrated in FIG. 14, the tunnel closed section forming member 33 is joined to the back face of the front tunnel member 31. In the meantime, the second horizontal member 40 which is a part of a panel closed section forming member 83 to be described later is joined to the face of the dash lower panel 10 on the vehicle compartment 2 side. This reduces the amount of offset H in the vertical direction between the closed section C7 and the closed section C8, as compared with the case of joining the tunnel closed section forming member 33 to the face of the front tunnel member 31 on the vehicle compartment 2 side.

Figure 10:
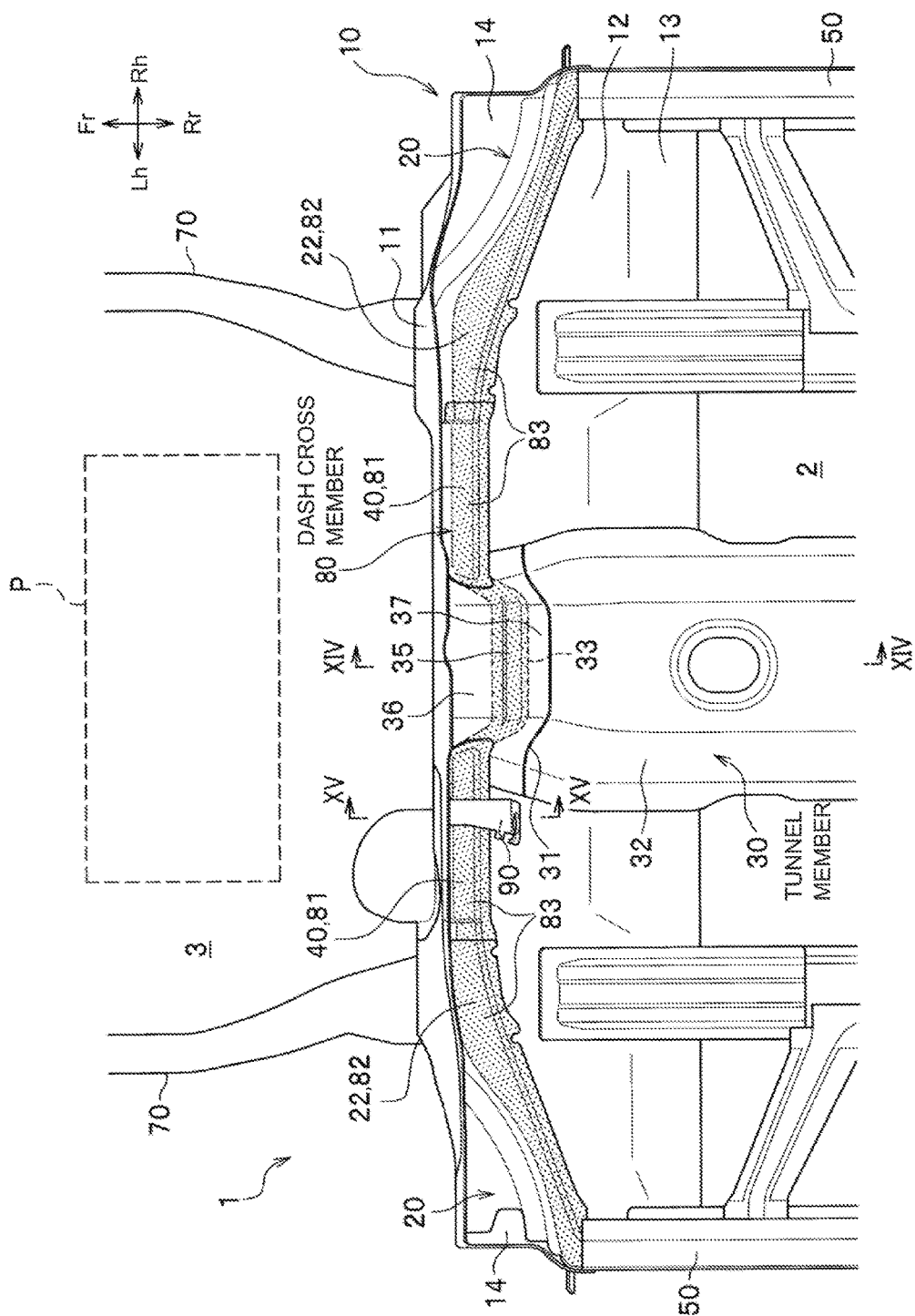
FIG. 10 is a plan view illustrating the vehicle body structure that we see when looking down from above.
Figure 11:
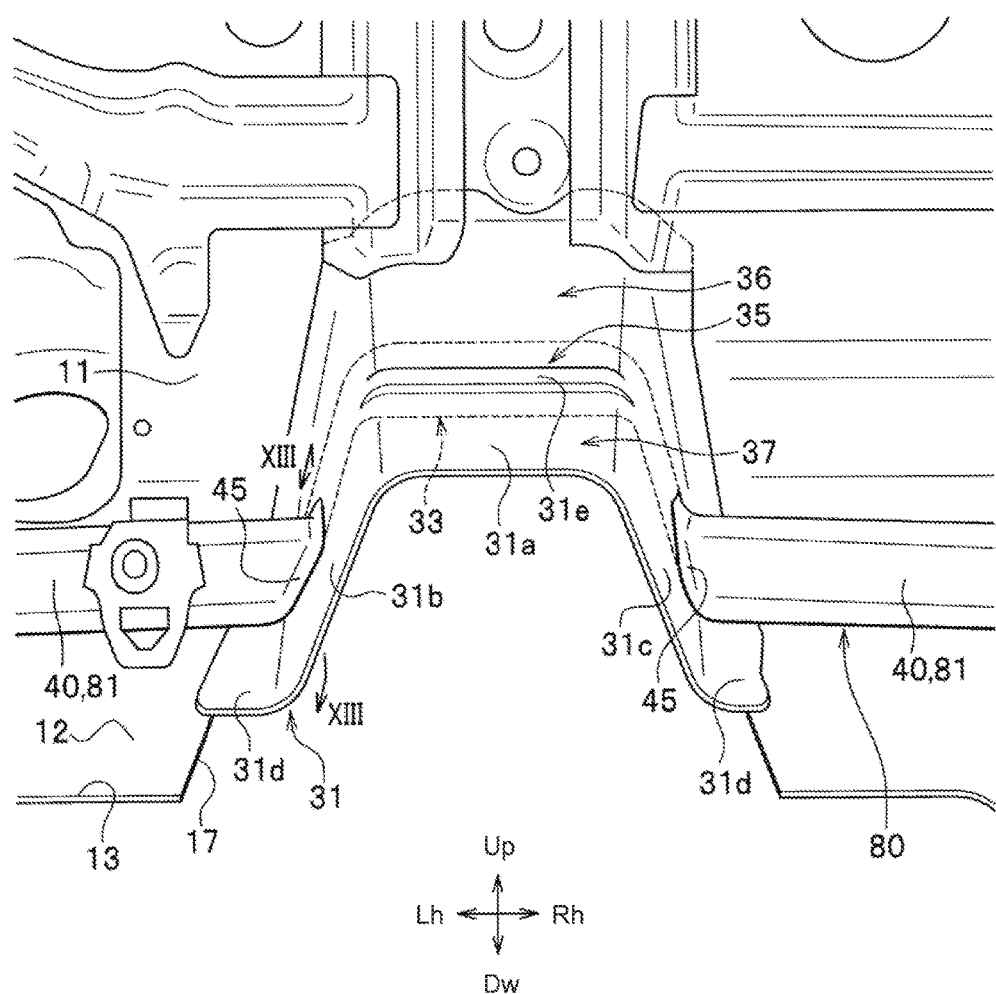
FIG. 11 is a rear view illustrating a front tunnel member seen from behind.

As illustrated in FIG. 10, the dash cross member 80 is a frame member being placed at the vehicle compartment 2 side of the dash lower panel 10 and constituting closed sections extending in the vehicle widthwise direction. The dash cross member 80 couples both of the left and right front pillar lowers 4 to each other. The dash cross member 80 has a convex shape such that its vehicle-widthwise central part is located ahead of its vehicle-widthwise both end parts in the plan view. The dash cross member 80 includes: the panel closed section forming member 83 forming a closed section in cooperation with the dash lower panel 10; and the tunnel closed section forming member 33 forming the closed section in cooperation with the front tunnel member 31.

The panel closed section forming member 83 is a member joined, at both sides of the runnel member 30, to the face of the dash lower panel 10 on the vehicle compartment 2 side. The panel closed section forming member 83 is constituted of: the second horizontal members 40 which are a pair of vehicle-widthwise members 81 arranged at vehicle-widthwise both sides of the tunnel member 30 so as to extend parallel with the vehicle widthwise direction; and the first horizontal closed section parts 22 which are a pair of rearward-tilting members 82 connected respectively to outer end parts of the vehicle-widthwise members 81 and located rearward as they extend outward in the vehicle widthwise direction. The second horizontal members 40 as the vehicle-widthwise members 81 are coupled to the tunnel closed section forming member 33 via the front tunnel member 31. The first horizontal closed section parts 22 as the rearward-tilting members 82 are formed integrally with the reinforcement panels 20.

Figure 15:
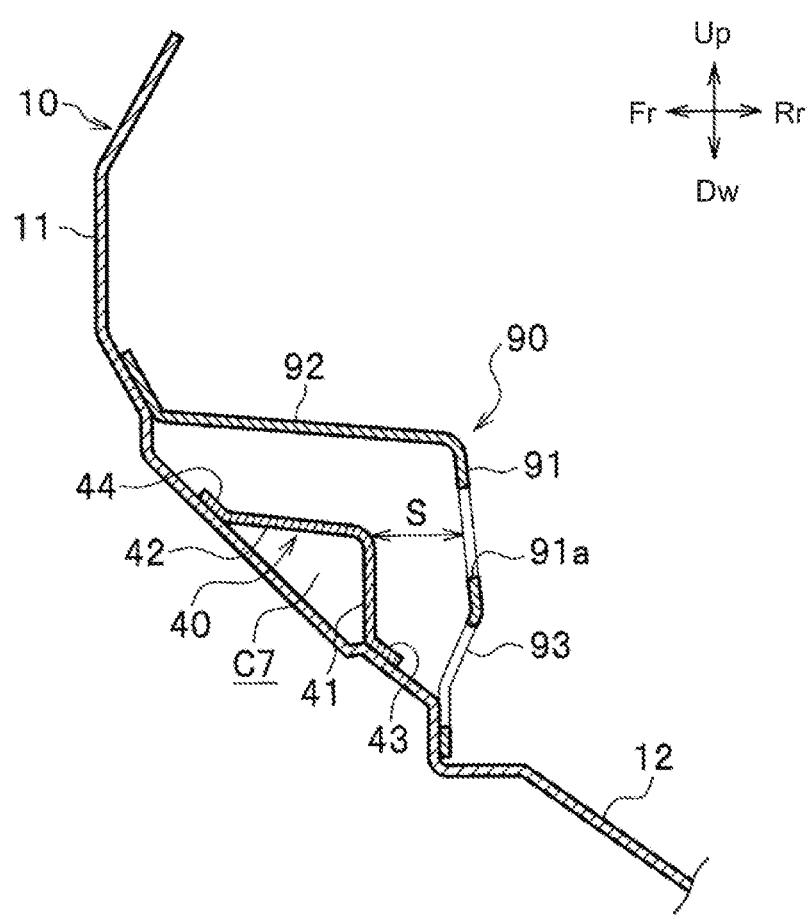
FIG. 15 is a vertical sectional view taken along the line XV-XV in FIG. 10.

As illustrated in FIG. 15, the sectional area of the closed section C7 formed by each second horizontal member 40 as the vehicle-widthwise member 81 and the dash lower panel 10 is smaller than that of the closed section C1 formed by each first horizontal closed section part 22 as the rearward-tilting member 82 and the dash lower panel 10 (see FIGS. 5 and 6). In addition, the first horizontal closed section part 22 as the rearward-tilting member 82 is disposed diagonally with respect to the second horizontal member 40 as the vehicle-widthwise member 81 like a diagonal brace. Thus, the vehicle-widthwise member 81 has lower bending strength against a load from the front than the rearward-tilting member 82.

As illustrated in FIG. 15, a pedal bracket 90 for supporting an accelerator pedal and the like (not illustrated) of the automobile V is installed on the left-side tilt part 12 of the dash lower panel 10. The pedal bracket 90 is installed so as to straddle the second horizontal member 40 as the vehicle-widthwise member 81 in the vertical direction. Specifically, the pedal bracket 90 has: a bracket body 91 being disposed with a clearance S behind the second horizontal member 40; an upper leg part 92 extending forward from the upper end of the bracket body 91 and being joined to the tilt part 12 above and ahead of the second horizontal member 40; and a lower leg part 93 extending downward from the lower end of the bracket body 91 and being joined to the tilt part 12 below and behind the second horizontal member 40. A through hole 91a for the accelerator pedal and the like to be mounted therein is formed in the bracket body 91.

Next, with reference mainly to FIG. 3 and FIGS. 16 to 21, a detailed description is given of the outriggers 60, the dash cross members 80, the side sills 50, the second floor frames 100, oblique braces 110, tunnel-side floor frames 120, and first horizontal members 130.

Figure 16:
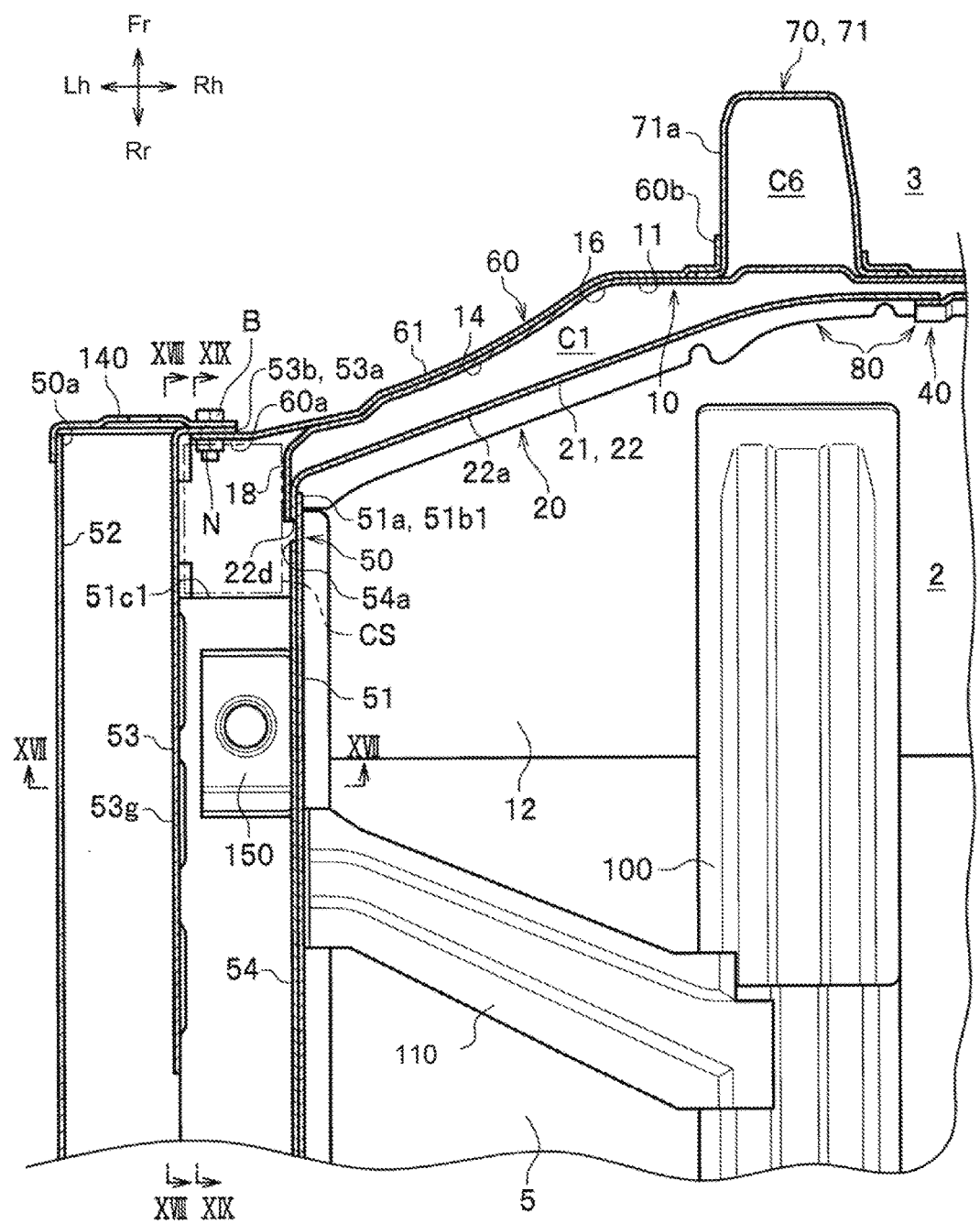
FIG. 16 is a horizontal sectional view taken along the line XVI-XVI in FIG. 2.
Figure 17:
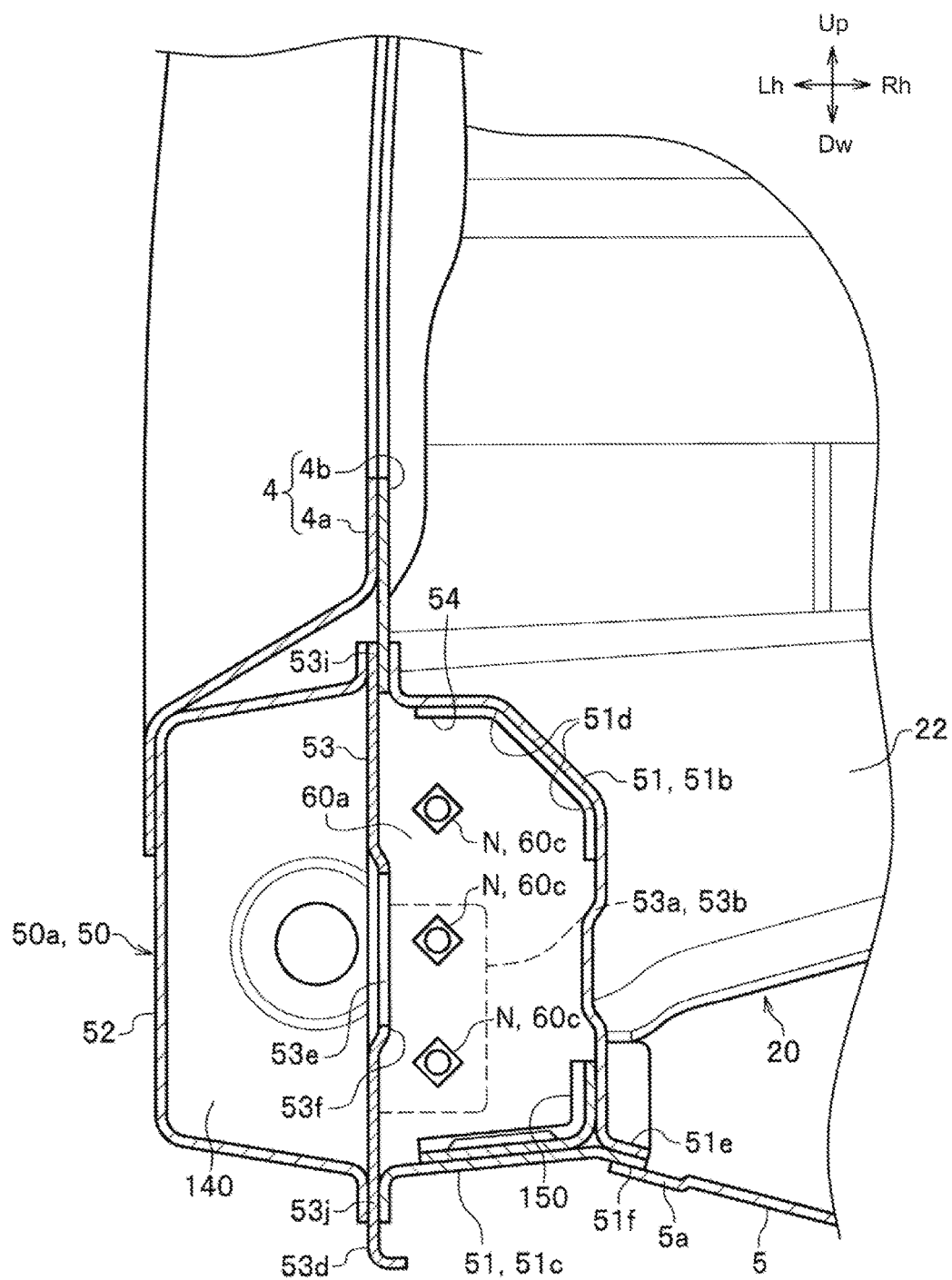
FIG. 17 is a vertical sectional view taken along the line XVII-XVII in FIG. 16.

As illustrated in FIGS. 16 and 17, the outrigger 60 is placed between the front side frame 70 and the side sill 50. A vehicle-widthwise inner end part 60*b* of the outrigger 60 is joined to an outer side face 71*a* of the curve part 71 or the front side frame 70 and the dash lower panel 10 by welding. Multiple (three in this embodiment) bolt holes 60*c* are formed in the vehicle-widthwise outer end part 60*a* of the outrigger 60 so as to be arranged one above another.

The lower two of the bolt holes 60*c* are used for fastening the jack up stiffener 53 and a lid member 140 to be described later to each other. The remaining bolt hole 60*c* is used for fastening a front pillar lower stiffener 4*a* and the lid member 140 to be described later to each other. A nut N is joined to the back side of each bolt hole 60*c* (the rear face of the outrigger 60) by welding.

As illustrated in FIG. 16, the reinforcement panel 20 and the second horizontal member 40 of the dash cross member 80 are each formed by bending a high-tensile steel plate into a predetermined shape by hot stamp forming, for example. The horizontal flange part 22*d* is formed in the vehicle-widthwise outer end part of the first horizontal closed section part 22 so as to bend rearward. In an area ahead of a side sill reinforcement panel 54, the horizontal flange part 22*d* is laid on a side face of the front end part 51*a* of the side sill inner panel 51 from the vehicle exterior side and, while the horizontal flange part 22*d* is sandwiched between the front end part 51*a* of the side sill inner panel 51 and the dash flange part 18 from the left and right, they are joined together (three-sheet joining) by spot welding.

The side sills 50 are arranged on both vehicle-widthwise outer end parts of the vehicle body. An opening of a front end part 50*a* of each side sill 50 (to be more specific, an opening between the side sill outer panel 52 and the jack up stiffener 53) is closed by the platy lid member 140 from the front.

As illustrated in FIG. 17, the side sill 50 is constituted of: the side sill inner panel 51 located on the vehicle compartment 2 side; and the side sill outer panel 52 located on the vehicle exterior side. The jack up stiffener 53 extending in the longitudinal direction between the side sill inner panel 51 and the side sill outer panel 52 is installed inside the front end part 50*a* of the side sill 50. The upper end part 53*i* and the lower end part 53*j* of the jack up stiffener 53 are each pinched between the side sill inner panel 51 and the side sill outer panel 52. The side sill reinforcement panel 54 which is a high strength member extending in the longitudinal direction is installed on a face of the side sill inner panel 51 on the vehicle exterior side. The front pillar lower 4 stands on the front end part 50*a* of the side sill 50.

The side sill inner panel 51 is constituted of two halves including: a side sill inner upper 51*b* located on the upper side; and a side sill inner lower 51*c* located on the lower side. The side sill inner upper 51*b* is formed by bending a general steel plate into a predetermined shape by press forming. The side sill inner upper 51*b* includes two angular ridge parts 51*d* extending in the longitudinal direction. The side sill inner lower 51*c* is formed by bending a high-tensile steel plate into a predetermined shape by hot stamp forming, for example. Because the side sill inner lower 51*c* is made of a high-tensile steel plate, it has higher strength than the side sill inner upper 51*b* made of a general steel plate.

An upper joint flange 51*e* extending toward the vehicle compartment 2 is placed on a lower end part of the side sill inner upper 51*b*. A lower joint flange 51*f* extending toward the vehicle compartment 2 is placed on a vehicle-widthwise inner end part of the side sill inner lower 51*c*. While the upper joint flange 51*e*, the lower joint flange 51*f*, and a vehicle-widthwise outer end part 5*a* of the floor panel 5 are laid one above another, they are joined together (three-sheet joining) by spot welding. A tie-down bracket 150 for a tie-down hook (not illustrated to engage therewith is installed in an area near the upper joint flange 51*e* and the lower joint flange 51*f*. In this respect, the upper joint flange 51*e* and the lower joint flange 51*f* may be laid one above another with the vehicle-widthwise outer end part 5*a* of the floor panel 5 interposed therebetween when they are joined together (three-sheet joining) by spot welding.

The side sill outer panel 52 basically has a groove shape (hat shape) that is open toward the vehicle compartment 2 in the sectional view. The side sill outer panel 52 is formed by bending a high-tensile steel plate into a predetermined shape by press forming. Because the side sill outer panel 52 is made of a high-tensile steel plate, it has higher strength than the side sill inner upper 51*b* made of a general steel plate.

The side sill reinforcement panel 54 which is a high strength member is formed by bending a high-tensile steel plate into a predetermined shape by hot stamp forming, for example. Because the side sill reinforcement panel 54 is made of a high-tensile steel plate, it has higher strength than the side sill inner upper 51*b* made of a general steel plate. The side sill reinforcement panel 54 is disposed along the angular ridge parts 51*d* of the side sill inner upper 51*b*.

Figure 19:
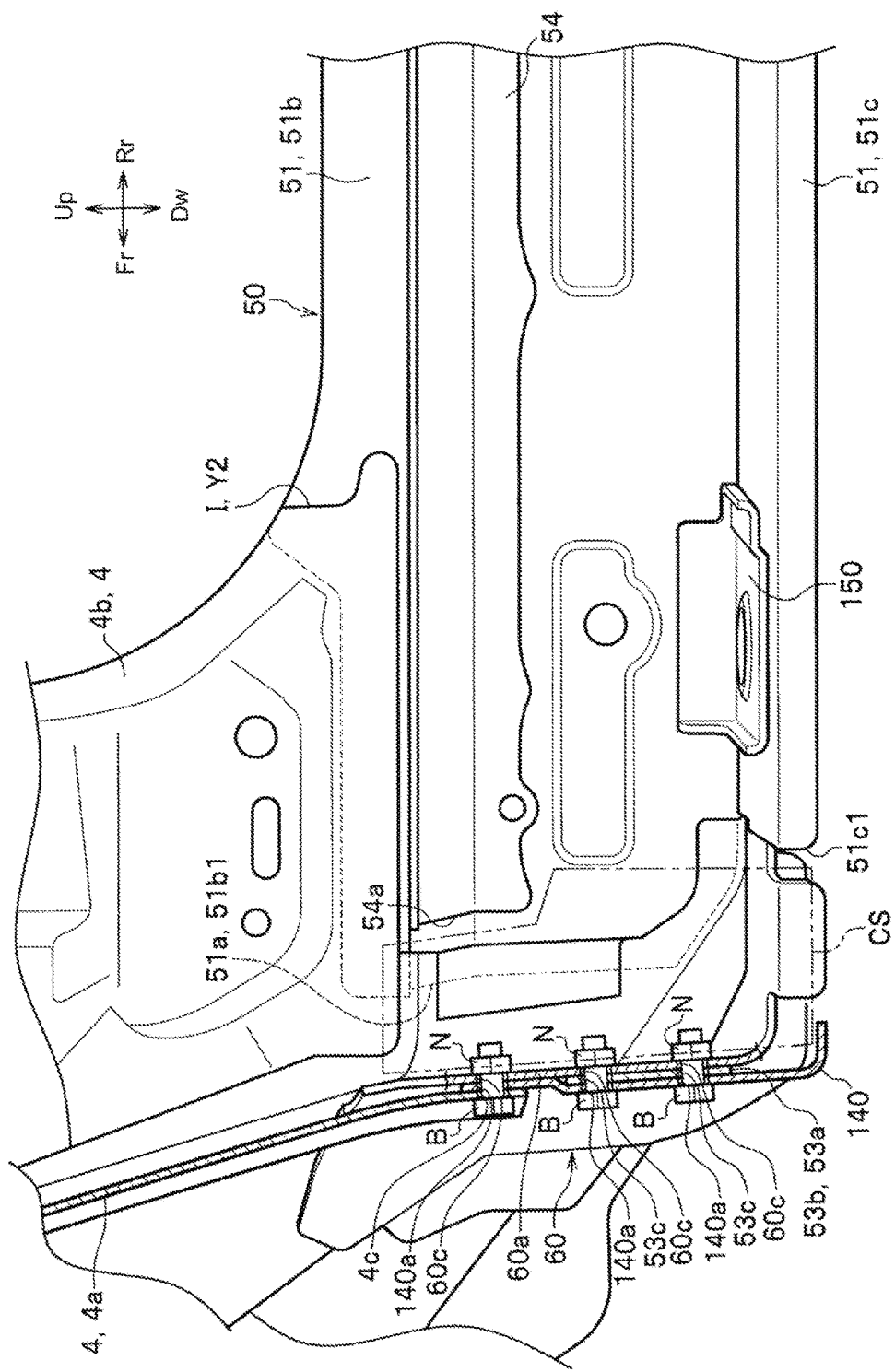
FIG. 19 is a vertical sectional view taken along the line XIX-XIX in FIG. 16.

As illustrated in FIG. 19, a crushing space CS (see a spot surrounded by a chain double-dashed line in FIG. 19) is provided near the front end part 50*a* of the side sill 50. The crushing space CS is a space (area) formed so that, in case a collision object such as a car in the opposing lane collides with the automobile V, for example, it may absorb collision energy by being crushed upon receipt of a collision load. The crushing space CS is formed by locating the high-strength side sill reinforcement panel 54 and side sill inner lower 51*c* behind the outrigger 60 with a space therebetween and thus making the strength of an area ahead of the front end part 54*a* of the side sill reinforcement panel 54 and a front end part 51*c*1 of the side sill inner lower 51*c* small relative to the others. In this respect, a front end part 51*b*1 of the side sill inner upper 51*b* is located ahead of the front end part 51*c* of the side sill inner lower 51*c* and the front end part 54*a* of the side sill reinforcement panel 54.

The crushing space CS is placed between the outrigger 60 and a set of the front end part 51*c*1 of the side sill inner lower 51*c* and the front end part 54*a* of the side sill reinforcement panel 54. In other words, the range of the crushing space CS in the longitudinal direction spans from the outrigger 60 to the set of the front end part 51*c*1 of the side sill inner lower 51*c* and the front end part 54*a* of the side sill reinforcement panel 54. The range of the crushing space CS in the vertical direction spans from the upper end of the side sill 50 to the lower end thereof.

Figure 18:
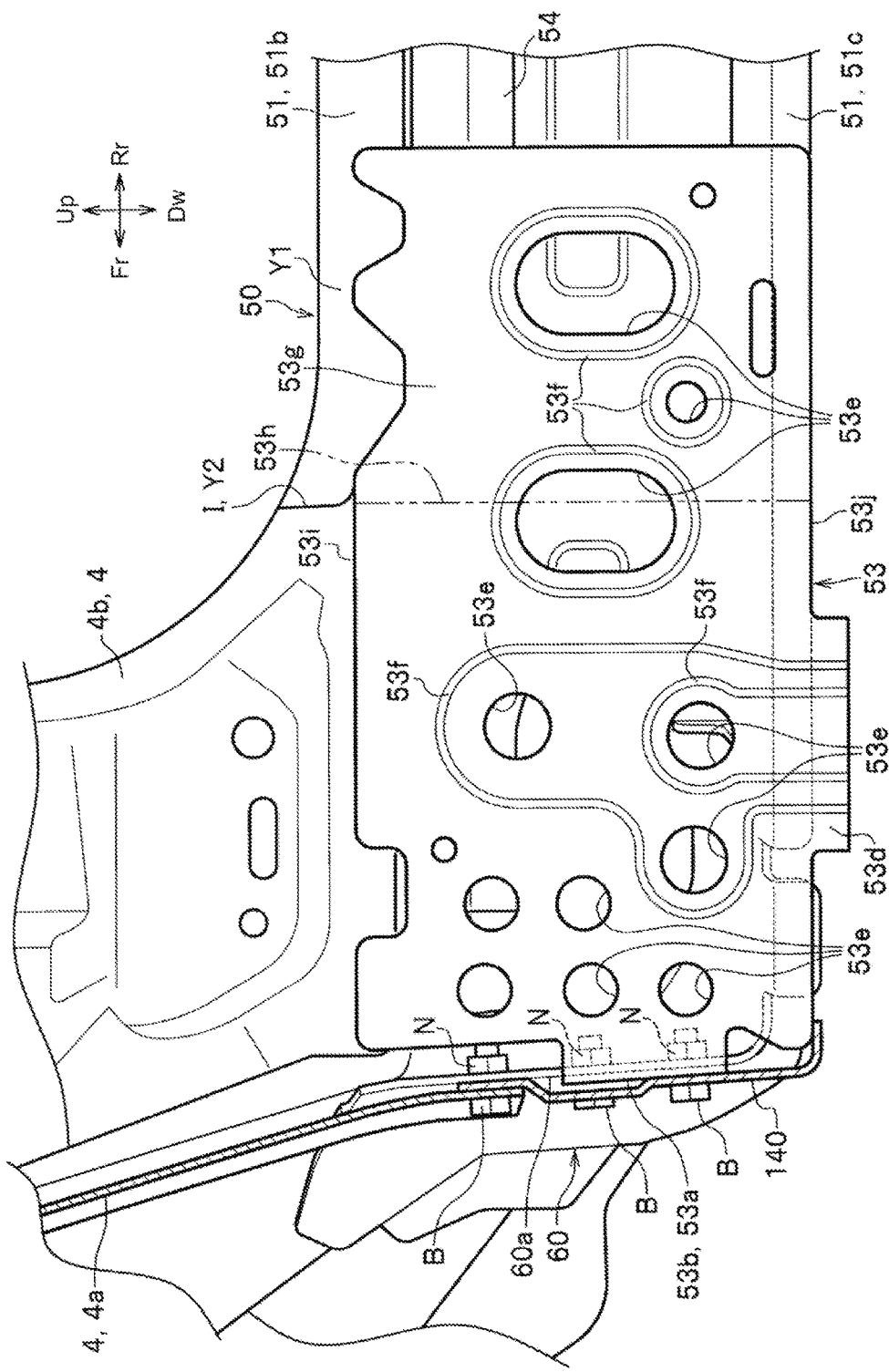
FIG. 18 is a vertical sectional view taken along the line XVIII-XVIII in FIG. 16.

As illustrated in FIGS. 18 and 19, the jack up stiffener 53 is installed below the front pillar lower 4. The jack up stiffener is provided at its front end part with the stiffener flange part 53*a* that is formed to bend inward in the vehicle widthwise direction. The stiffener flange part 53*a* as a front flange has two bolt holes 53*c* at positions corresponding to the lower two of the bolt holes 60*c* of the outrigger 60. In addition, the lid member 140 has three bolt holes 140*a* at positions corresponding to the bolt holes 60*c* of the outrigger 60. The front pillar lower stiffener 4*a* has a bolt hole 4*c* at a position corresponding to the upper one of the bolt holes 60*c* of the outrigger 60. The vehicle-widthwise outer end part 60a off the outrigger 60, the stiffener flange port 53a being a front end part 53b of the jack up stiffener 53, and the lid member 140 are laid one in front of another and fixed integrally with bolts B. Besides, the vehicle-widthwise outer end part 60a of the outrigger 60, the lid member 140, and the front pillar lower stiffener 4a are laid one in front of another and fixed integrally with a bolt B.

The jack up stiffener 53 is provided, on the front side of its lower end part, with a jack up part 53d that is to be supported by a jack (not illustrated). The jack up part 53d protrudes downward of the other portions. Multiple through holes 53e each having a circular shape or a vertically long elliptical shape in the side view are formed in the jack up stiffener 53. Although the through holes 53e are formed substantially throughout the jack up stiffener 53, a larger number of through holes are arranged in a part nearer to the front part located in the crushing space CS. A step part 53f bulging toward the vehicle compartment 2 is formed on the circumference of each of the multiple through holes 53e including the through holes 53e located above the jack up part 53d.

Since the jack up stiffener 53 is made of a sheet of general steel plate having the through holes 53e, its compressive strength against a load from the front is lower than that of the side sill inner panel 51 and the side sill outer panel 52 that are partially or entirely made of a high-tensile steel plate and have no through hole. This makes the jack up stiffener 53 likely to be crushed in the event of a small overlap collision or the like. The upper end part 53i of the jack up stiffener 53 is joined to a lower end part of a front pillar lower inner 4b by welding. The jack up stiffener 53 has an extension part 53g that extends rearward of an intersection part I between the side sill inner panel 51 and the front pillar lower 4.

Here, a description is given of a bend part that is a base point at which the front pillar lower (front pillar) 4 falls rearward upon receipt of a collision load from the front. Reference numeral Y2 in FIG. 18 indicates the position of the bend part in the case of no extension part 53g. Specifically, in the case where a rear end part 53h of the jack up stiffener 53 coincides with the intersection part I between the side sill inner panel 51 and the front pillar lower 4 in the longitudinal direction, a bend part Y2 coincides with the intersection part I. On the other hand, in this embodiment, because the jack up stiffener 53 has the extension part 53g that extends rearward of the intersection part I between the side sill inner panel 51 and the front pillar lower 4, a bend part Y1 of the front pillar lower 4 is located behind the intersection part I. Thereby, in this embodiment, the front pillar lower 4 is less likely to fall rearward as compared with the case of no extension part 53g.

As illustrated in FIG. 16, the second floor frame 100 extending in the longitudinal direction is installed on an upper face of the floor panel 5. The second floor frame 100 is installed inside the side sill 50 in the vehicle widthwise direction with a space therebetween. The second floor frame 100 is installed outside the tunnel member 30 (see FIG. 10) in the vehicle widthwise direction with a space therebetween. In other words, the second floor frame 100 is installed between the side sill 50 and the tunnel member 30. The second floor frame 100 is joined to the upper face of the floor panel 5 by welding.

The oblique braces 110 are installed on the upper face of the floor panel 5. Each oblique brace 110 is a member disposed behind the crushing space CS and designed to couple the side all 50 and the second floor frame 100 to each other. The oblique brace 110 serves to support the side sill 50 from the vehicle compartment 2 side and thereby suppress bending of the side sill 50 toward the vehicle compartment 2. Hence, the coupling portion between the side sill 50 and the oblique brace 110 is set to have higher strength than the crushing space CS located ahead of this coupling portion. The oblique brace 110 is formed by bending a steel plate substantially in a hat shape by press forming, for example. One end part of the oblique brace 110 is joined to the side sill inner panel 51 by welding. The other end part of the oblique brace 110 is joined to the second floor frame 100 by welding. The oblique brace 110 is disposed to tilt in such a way as to be located rearward as it extends inward in the vehicle widthwise direction from the side sill 50 to the second floor frame 100.

As illustrated in FIG. 3, the tunnel-side floor frames 120 extending in the longitudinal direction are installed on a lower face of the floor panel 5. Each tunnel-side floor frame 120 which is a first floor frame is disposed on inner side of the front side frame 70 in the vehicle widthwise direction with a space therebetween. The tunnel-side floor frame 120 is joined to the lower face of the floor panel 5 by welding. A vehicle-widthwise outer end part of each first horizontal member 130 is joined to a sidewall of the front side frame 70 by welding. A vehicle-widthwise inner end part of the first horizontal member 130 is joined to the sidewall of the tunnel member 30 by welding.

The first horizontal members 130 extending in the vehicle widthwise direction are joined to the dash lower panel 10 on the power source device compartment 3 side. Each first horizontal member 130 is placed on the opposite side of the front side frame 70 from the outrigger 60. The first horizontal member 130 is joined to a front end part of the tunnel-side floor frame 120 by welding. The first horizontal member 130 is formed by bending a high-tensile steel plate into a predetermined shape by hot stamp forming, for example.

Figure 21:
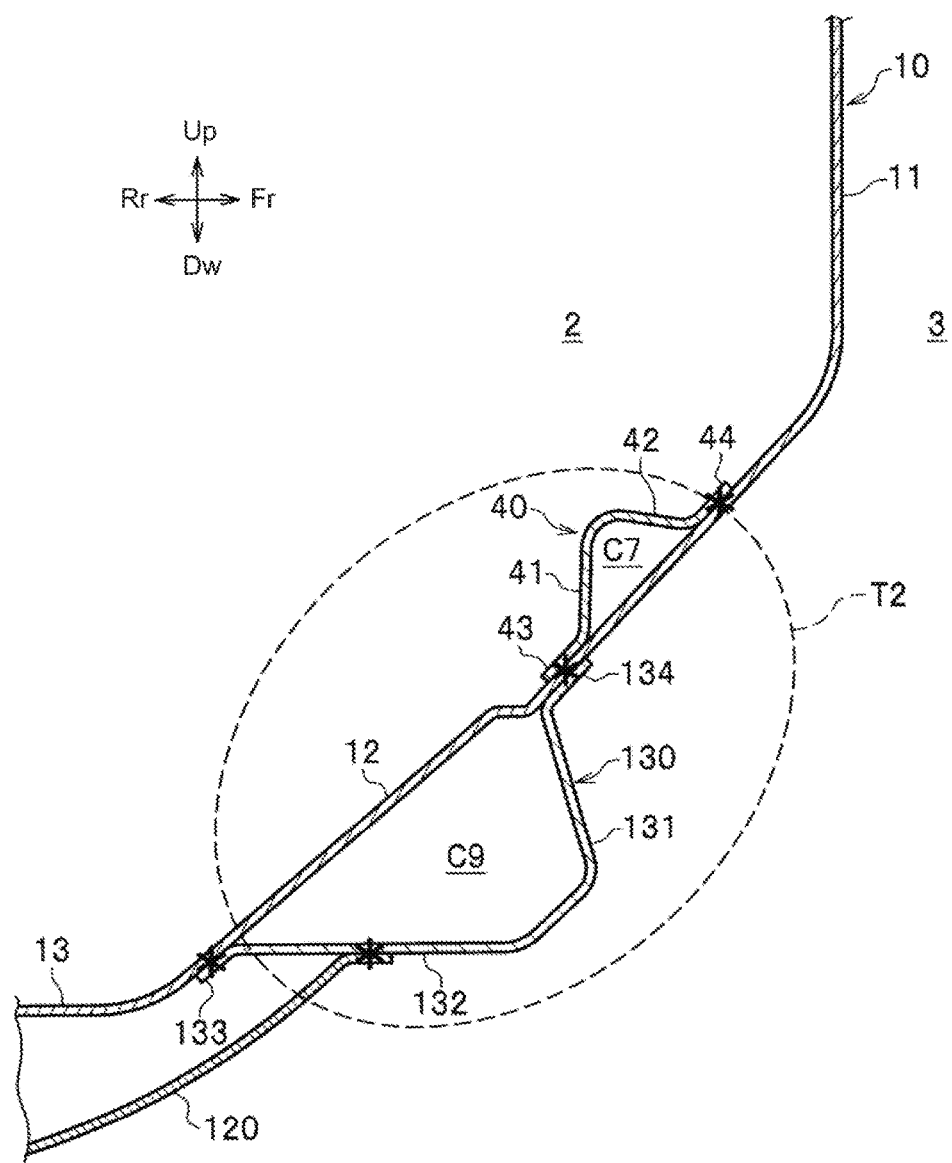
FIG. 21 is a vertical sectional view taken along the line XXI-XXI in FIG. 3.

As illustrated in FIG. 21, the first horizontal member 130 is formed to substantially have a hat shape in the vertical sectional view. The first horizontal member 130 includes: a first horizontal member vertical wall part 131 extending in the vertical direction and curving to protrude forward; a first horizontal member lower wall part 132 extending rearward front the lower end of the first horizontal member vertical wall part 131; a first horizontal member lower flange part 133 extending downward and rearward from the lower end of the first horizontal member lower wall part 132; and a first horizontal member upper flange part 134 extending upward and forward from the upper end of the first horizontal member vertical wall part 131.

The first horizontal member lower flange part 133 and the first horizontal member upper flange part 134 are joined to the tilt part 12 of the dash floor panel 10 by welding. Thereby, the tilt part 12, the first horizontal member vertical wall part 131, and the first horizontal member lower wall part 132 together form a first horizontal member closed section C9 extending in the vehicle widthwise direction. The first horizontal member upper flange part 134, the tilt part 12, and the horizontal member lower flange part 43 are joined together (three-sheet joining) by spot welding. The first horizontal member 130 is disposed below and adjacent to the second horizontal member 40 of the dash cross member 80.

As illustrated in FIG. 20, the outrigger bottom wall part 62 is disposed below the lower edge part 27 of the reinforcement panel 20 and extends rearward of the lower edge part 27 of the reinforcement panel 20. Thereby, the outrigger lower flange part 62a is disposed below and behind the lower edge part 27 of the reinforcement panel 20. A substantially vertical cross member flange 28 joined to the dash lower panel 10 is formed on the reinforcement panel 20 at a position between the lower wall part 23c and the upper wall part 22b. The cross member flange 28 and the outrigger upper flange part 61a are joined together by spot welding with the dash lower panel 10 interposed therebetween (three-sheet joining). The cross member flange 28 corresponds to a cross member upper flange in the claims. The lower edge part 27 corresponds to a cross member lower flange in the claims.

Here, a detailed description is given of the closed sections C1, C4, C7, and C9 formed between the dash lower panel 10 and each of the dash cross member 80, the outrigger 60, and the first horizontal member 130.

As illustrated in FIG. 20, the dash lower panel 10 and the first horizontal closed section part 22 constituting a part of the dash cross member 80 form the first horizontal closed section C1 extending in the vehicle widthwise direction. The dash lower panel 10 and the outrigger vertical wall part 61 of the outrigger 60 form the outrigger first closed section C4 extending in the vehicle widthwise direction. The first horizontal closed section C1 and the outrigger first closed section C4 are located at positions overlapping each other in the longitudinal direction and form a sectional overlap area T1 having a large sectional area. The first horizontal closed section C1 corresponds to a part of a first closed section in the claims, and the outrigger first closed section C4 corresponds to a second closed section in the claims.

As illustrated in FIG. 21, the dash lower panel 10 and the second horizontal member 40 constituting a part of the dash cross member 80 form the closed section C7 extending in the vehicle widthwise direction. The dash lower panel 10, the first horizontal member vertical wall part 131, and the first horizontal member lower wall part 132 form the first horizontal member closed section C9 extending in the vehicle widthwise direction. The first horizontal member closed section C9 is located below and behind the closed section C7, and they are located at positions not overlapping each other in the longitudinal direction. To put it another way, the closed section C7 and the first horizontal member closed section C9 are located at positions displaced from each other in the vertical direction, and form a sectional displacement area T2 having sectional strength lower than the sectional overlap area T1. The closed section C7 corresponds to a part of the first closed section in the claims. The first horizontal member closed section C9 corresponds to a third closed section in the claims.

The vehicle body structure 1 according to this embodiment basically has the above configuration. Next, the workings and effect of the vehicle body structure 1 will be described.

According to the vehicle body structure 1 of this embodiment, the outrigger 60 is coupled to the front end part 53b of the jack up stiffener 53 having compressive strength against a load from the front lower than the side sill 50. This enables the jack up stiffener 53 to absorb collision energy by being crushed in the event of a small overlap collision or an oblique collision against the front pillar. Thereby, acceleration of deceleration to be applied on an occupant can be reduced.

In addition, the crushing space CS is provided between the outrigger 60 and the front end part 54a of the side sill reinforcement panel 54. Thus, if the outrigger 60 is retracted at the time of collision, collision energy can be absorbed by the crush of the crushing space CS. Besides, the vehicle-widthwise outer end part of the dash cross member 80 is coupled to the side sill inner panel 51 at a position ahead of the side sill reinforcement panel 54. Thus, even if the outrigger 60 is retracted, the dash cress member 80 is supported by the side sill reinforcement panel 54 from behind and therefore less likely to be retracted, which suppresses deformation of the vehicle compartment 2. Accordingly, it is possible to facilitate absorption of collision energy and suppress deformation of the vehicle compartment 2 at the same time.

Further, the multiple through holes 53e are formed in the jack up stiffener 53. This makes the jack up stiffener 53 likely to be crushed in the event of a collision, and enables weight reduction of the jack up stiffener 53.

Furthermore, the step part 53f is formed on the circumference of each of the through holes 53e located above the jack up part 53d. This makes the jack up stiffener 53 weak and likely to be crushed against a load from the front and, in contrast, strong against a load in the vertical direction.

When a collision load is applied on the front side frame 70 by a frontal collision, the collision load is transmitted from the rear end of the front side frame 70 to the dash cross member 80. Then, the dash cross member 80 is retracted (deformed) by a larger amount in the sectional displacement area T2 with low sectional strength formed by the closed section C7 and the first horizontal member closed section C9 than in the sectional overlap area T1 formed by the first horizontal closed section C1 and the outrigger first closed section C4. Thereby, collision energy can be absorbed, and thus acceleration of deceleration to be applied on an occupant can be reduced. Moreover, since the dash cross member 80 has a convex shape such that its vehicle-widthwise central part is located ahead of its vehicle-widthwise both end parts in the plan view, even if the amount of retraction of the sectional displacement area T2 located on the vehicle-widthwise central part side is large, it is possible to absorb collision energy and, at the same time, secure a large space on the vehicle compartment 2 side.

In addition, the cross member flange 28 and the outrigger upper flange part 61a are joined together with the dash lower panel 10 interposed therebetween, and the outrigger lower flange part 62a is disposed behind the lower edge part 27 as the cross member lower flange. Thereby, in the event of a small overlap collision or the like, it is possible to absorb collision energy by tolerating deformation of the outrigger 60, and reduce damage to be applied on leg parts of an occupant by suppressing deformation of the dash cross member 80.

Besides, the upper joint flange 51e of the side sill inner upper 51b, the lower joint flange 51f of the side sill inner lower 51c with higher strength than the side sill inner upper 51b, and the vehicle-widthwise outer end part 5a of the floor panel 5 are joined together by spot welding while being laid one above another, and the side sill reinforcement panel 54 is disposed along the angular ridge parts 51d of the side sill inner upper 51b. This makes it possible to secure strength enough to support a collision load while reducing the weight of the side sill inner panel 51.

Further, the tie-down bracket 150 for the tie-down hook (not illustrated) to engage therewith is installed in the area near the upper joint flange 51e and the lower joint flange 51f. This makes it possible to increase the strength of the side sill inner panel 51 in the area near the upper joint flange 51e and the lower joint flange 51f.

Furthermore, the vehicle-widthwise inner end part 60b of the outrigger 60 is joined to the outer side face of the front side frame 70 and the dash lower panel 10 by welding, and the vehicle-widthwise outer end part 60a of the outrigger 60, the stiffener flange part 53a of the jack up stiffener 53, and the lid member 140 are laid one in front of another and fixed with the bolts B. Thus, since the members are assembled together by full use of welding and the bolts B, it is possible to perform the assembly work without any trouble and increase assembly strength between the members.

In addition, since the first horizontal closed section part 22 is formed integrally with the reinforcement panel 20, the support performance of the dash cross member 80 against a collision load is enhanced.

Besides, when a collision load is applied on the front side frame 70 by a frontal collision, the collision load is transmitted from the rear end of the front side frame 70 to the dash cross member 80. Although the collision load is transmitted also to the first horizontal member 130 adjacent to the dash cross member 80, deformation of the first horizontal member 130 toward the vehicle compartment 2 can be suppressed because the first horizontal member 130 is supported by the tunnel-side floor frame 120.

Further, since the rear end part of the curve part 71 of the front side frame 70 is coupled to the second floor frame 100, a collision load applied on the front side frame 70 by a frontal collision can be transmitted to the second floor frame 100.

Furthermore, since the vehicle-widthwise inner side of the side sill 50 is supported by the oblique brace 110, the coupling portion between the side sill 50 and the oblique brace 110 has higher strength than the crushing space CS located ahead of this coupling portion. Thus, in the event of a small overlap collision or the like, the side sill 50 can absorb collision energy by the local crush of the crushing space CS located ahead of the coupling portion between itself and the oblique brace 110, and thereby can favorably suppress deformation of an area behind the coupling portion between itself and the oblique brace 110.

In addition, the rear part of the jack up stiffener 53 is fixed on the side sill inner panel 51 while extending rearward of the intersection part I between the side sill inner panel 51 and the front pillar lower 4. Thereby, the bend part Y1 of the front pillar lower 4, which is bent against a collision load in the event of a small overlap collision or the like, can be set behind the intersection part I. This makes the front pillar lower 4 less likely to fall rearward, and thus makes it possible to keep the shape of a door opening and inhibit a front side door (not illustrated) from becoming hard to open.

The vehicle body structure 1 according to this embodiment has been described in detail above with reference to the drawings; however, the present invention is not limited thereto and may be changed as appropriate without departing from the gist of the present invention.

For example, the first horizontal closed section part 22 may be configured separately from the reinforcement panel 20. In addition, the first horizontal closed section part 22 and the second horizontal member 40 may be formed integrally. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure comprising:
a dash lower panel that partitions a power source device compartment from a vehicle compartment;
an outrigger that is placed on a power source device compartment side of said dash lower panel and extends in a vehicle widthwise direction;
a dash cross member that is placed on a vehicle compartment side of said dash lower panel and extends in the vehicle widthwise direction to couple left and right front pillars to each other; and
a side sill that is placed on a vehicle-widthwise outer end part of a vehicle body and extends in a longitudinal direction, wherein
the side sill includes a jack up stiffener inside thereof, the jack up stiffener having lower compressive strength against a load from a front than that of said side sill,
said outrigger is coupled to a front end part of said jack up stiffener, and
said dash cross member is coupled to a front end part of said side sill.

2. The vehicle body structure according to claim 1, wherein
said side sill includes a side sill inner panel on a vehicle interior side and a side sill outer panel on a vehicle exterior side,
said side sill inner panel is provided with a high strength member having strength higher than said side sill inner panel,
a crushing space is placed between said outrigger and a front end part of said high strength member, and
a vehicle-widthwise outer end part of said dash cross member is coupled to said side sill inner panel at a position ahead of said high strength member.

3. The vehicle body structure according to claim 1, wherein a through hole is provided in said jack up stiffener.

4. The vehicle body structure according to claim 3, wherein
said jack up stiffener includes a jack up part that is disposed under the through hole and to be supported by a jack, and
a step part is disposed on a periphery of said through hole.

5. The vehicle body structure according to claim 1, wherein
said structure comprises:
a front side frame that is placed on the power source device compartment side of said dash lower panel and extends in the longitudinal direction, wherein said outrigger is placed between said front side frame and said side sill; and
a first horizontal member that is placed opposite to said outrigger with said front side frame interposed therebetween,
said dash cross member and said dash lower panel form a first closed section,
said outrigger and said dash lower panel form a second closed section,
said first horizontal member and said dash lower panel form a third closed section,
said first closed section and said second closed section are located at positions overlapping each other in the longitudinal direction, and
said first closed section and said third closed section are located at positions displaced from each other in a vertical direction.

6. The vehicle body structure according to claim 1, wherein
said dash cross member and said outrigger are each made of a high strength member, said dash cross member includes a cross member upper flange and a cross member lower flange both joined to said dash lower panel, said outrigger includes an outrigger upper flange part and an outrigger lower flange part both joined to said dash lower panel, said cross member upper flange and said outrigger upper flange part are joined together with said dash lower panel interposed therebetween, and said outrigger lower flange part is disposed rearward of said cross member lower flange.

7. The vehicle body structure according to claim 2, wherein
said side sill inner panel includes:
a side sill inner upper that is made of a steel plate and includes an angular ridge part; and
a side sill inner lower that has strength higher than said side sill inner upper,
a side sill reinforcement panel as said high strength member is bent so as to be disposed along said angular ridge part,
said side sill inner upper and said side sill inner lower respectively have joint flanges that are joined together, and
said joint flanges are laid on a vehicle-widthwise outer end part of a floor panel, said joint flanges and said vehicle-widthwise outer end part are joined together.

8. The vehicle body structure according to claim 7, wherein a tie-down bracket for a tie-down hook to engage therewith is installed in an area near said joint flange of said side sill inner panel.

9. The vehicle body structure according to claim 5, further comprising a lid member that covers and closes a front end opening of said side sill, wherein
the front end part of said jack up stiffener includes a front flange bent inward in the vehicle widthwise direction,
a vehicle-widthwise inner end part of said outrigger is joined to an outer side face of said front side frame and said dash lower panel by welding, and
a vehicle-widthwise outer end part of said outrigger, said front flange of said jack up stiffener, and said lid member are laid one in front of another and fixed with a bolt.

10. The vehicle body structure according to claim 1, wherein
said dash lower panel includes a wheel arch-shaped part constituting a part of a wheel arch,
said structure further comprises a reinforcement panel that covers a vehicle compartment side of said wheel arch-shaped part, and said dash cross member is formed integrally with said reinforcement panel.

11. The vehicle body structure according to claim 5, further comprising a first floor frame that is disposed on a lower face of a floor panel and on an inner side of said front side frame in the vehicle widthwise direction, wherein
said first horizontal member is coupled to a front end part of said first floor frame, and disposed close to and below said dash cross member.

12. The vehicle body structure according to claim 5, further comprising a second floor frame that is disposed on an upper face of said floor panel and extends in the longitudinal direction, wherein
said dash lower panel includes a tilt part that tilts downward toward a rear,
said front side frame includes a bent part that bends downward along said tilt part of said dash lower panel, and
a rear end part of said bent part is coupled to said second floor frame.

13. The vehicle body structure according to claim 2, further comprising:
a second floor frame that is disposed on an upper face of a floor panel and on an inner side of said side sill in the vehicle widthwise direction, and extends in the longitudinal direction; and
an oblique brace that couples said side sill and said second floor frame to each other, and is disposed to tilt in such a way as to be located rearward as said oblique brace extends inward in the vehicle widthwise direction, and
said oblique brace is disposed at a rear of said crushing space.

14. The vehicle body structure according to claim 2, wherein a vehicle-widthwise outer end part of the outrigger extends in the vehicle widthwise direction beyond the vehicle-widthwise outer end part of the dash cross member and is joined to the front end part of said jack up stiffener.

15. The vehicle body structure according to claim 2, wherein the front end part of the high strength member is offset rearward from a front end of the side sill, and the crushing space is disposed between the front end of the side sill and the front end part of the high strength member.

16. The vehicle body structure according to claim 7, wherein a front end of the side sill inner lower is offset rearward from a front end of the sill inner upper, and the front end of the sill inner upper is joined to the dash cross member.

* * * * *